(12) United States Patent
Qiao et al.

(10) Patent No.: US 11,659,097 B2
(45) Date of Patent: *May 23, 2023

(54) CHARGING POLICY INFORMATION FOR A PACKET DATA UNIT SESSION OF A WIRELESS DEVICE

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Sterling, VA (US); Jayshree Bharatia, Plano, TX (US)

(73) Assignee: Ofinno, LLC, Reston, VA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/340,796

(22) Filed: Jun. 7, 2021

(65) Prior Publication Data

US 2021/0297536 A1 Sep. 23, 2021

Related U.S. Application Data

(63) Continuation of application No. 16/564,236, filed on Sep. 9, 2019, now Pat. No. 11,039,018.

(Continued)

(51) Int. Cl.
*H04M 15/00* (2006.01)
*H04W 8/22* (2009.01)
*H04W 84/04* (2009.01)

(52) U.S. Cl.
CPC ........... *H04M 15/66* (2013.01); *H04M 15/64* (2013.01); *H04M 15/65* (2013.01); *H04W 8/22* (2013.01); *H04W 84/042* (2013.01)

(58) Field of Classification Search
CPC ...... H04M 15/66; H04M 15/64; H04M 15/65; H04M 15/8038; H04M 15/8033;
(Continued)

(56) References Cited

U.S. PATENT DOCUMENTS

2016/0353268 A1 12/2016 Senarth et al.
2017/0339282 A1 11/2017 Li et al.
(Continued)

OTHER PUBLICATIONS

3GPP TS 23.203 V15.3.0 (Jun. 2018); Technical Specification; 3rd Generation Partnership Project; Technical Specification Group Services and System Aspects; Policy and charging control architecture (Release 15).
(Continued)

*Primary Examiner* — Charles T Shedrick
(74) *Attorney, Agent, or Firm* — Peter Flanagan; Kavon Nasabzadeh; Philip R. Smith

(57) ABSTRACT

A charging function (CHF) receives, from a policy control function (PCF), a first request for charging policy information for a packet data unit (PDU) session of a wireless device. The charging policy information is determined for the PDU session of the wireless device. The charging policy information indicates a charging method comprising one or more of: online charging; offline charging; and converged charging. A message comprising the charging policy information is sent to the PCF. The CHF receives from a session management function (SMF), a second request to establish a charging session. The second request comprises the charging method. A confirmation for the charging method is sent to the SMF.

20 Claims, 21 Drawing Sheets

Related U.S. Application Data

(60) Provisional application No. 62/730,850, filed on Sep. 13, 2018.

(58) Field of Classification Search
CPC ... H04M 15/8228; H04M 15/00; H04W 8/22; H04W 84/042; H04W 4/24; H04L 12/14; H04L 12/1407
See application file for complete search history.

(56) References Cited

U.S. PATENT DOCUMENTS

| | | | |
|---|---|---|---|
| 2018/0367675 | A1 | 12/2018 | Ni et al. |
| 2019/0109823 | A1* | 4/2019 | Qiao .................. H04L 47/24 |
| 2019/0158985 | A1 | 5/2019 | Dao et al. |
| 2019/0182655 | A1 | 6/2019 | Gupta et al. |
| 2019/0207778 | A1 | 7/2019 | Qiao et al. |
| 2020/0007590 | A1 | 1/2020 | Dodd-Noble et al. |
| 2020/0092423 | A1* | 3/2020 | Qiao .................. H04W 8/08 |
| 2020/0092424 | A1* | 3/2020 | Qiao .................. H04M 15/8033 |
| 2020/0100075 | A1* | 3/2020 | Chai .................. H04L 12/14 |
| 2021/0297536 | A1* | 9/2021 | Qiao .................. H04M 15/64 |

OTHER PUBLICATIONS

3GPP TS 23.502 V15.2.0 (Jun. 2018); Technical Specification; 3rd Generation Partnership Project; Technical Specification Group Services and System Aspects; Procedures for the 5G System; Stage 2; (Release 15).

3GPP TS 23.503 V15.2.0 (Jun. 2018); Technical Specification; 3rd Generation Partnership Project; Technical Specification Group Services and System Aspects; Policy and Charging Control Framework for the 5G System; Stage 2; (Release 15).

3GPP TS 29.244 V14.0.0 (Jun. 2017); Technical Specification; 3rd Generation Partnership Project; Technical Specification Group Core Network and Terminals; Interface between the Control Plane and the User Plane of EPC Nodes; Stage 3; (Release 14).

3GPP TS 32.240 V15.1.0 (Mar. 2018); Technical Specification; 3rd Generation Partnership Project; Technical Specification Group Services and System Aspects; Telecommunication management; Charging management; Charging architecture and principles.

3GPP TS 32.255 V1.1.0 (Jul. 2018); Technical Specification; 3rd Generation Partnership Project; Technical Specification Group Services and System Aspects; Telecommunication management; Charging management; 5G Data connectivity domain charging.

3GPP TS 32.290 V15.0.0 (Jun. 2018); Technical Specification; 3rd Generation Partnership Project; Technical Specification Group Services and System Aspects; Telecommunication management; Charging management; 5G system; Services, operations and procedures of; charging using Service Based Interface (SBI).

3GPP TS 32.291 V0.4.0 (Jun. 2018); Technical Specification; 3rd Generation Partnership Project; Technical Specification Group Services and System Aspects; Telecommunication management; Charging management; 5G system, Charging service; stage 3.

3GPP TR 32.899 V15.1.0 (Mar. 2018); Technical Report; 3rd Generation Partnership Project; Technical Specification Group Services and System Aspects; Telecommunication management; Charging management; Study on charging aspects of 5G system architecture phase 1.

S5-183221; 3GPP TSG SA WG5 (Telecom Management) Meeting #119; May 14-18, 2018, La Jolla (US)revision of S5-18xabc; Source:Huawei Technologies; Title:pCR TS 32.255 Charging for support of Network Slicing; Document for:Approval.

S5-183374; 3GPP TSG SA WG5 (Telecom Management) Meeting #119; May 14-18, 2018, La Jolla (US)revision of S5-183221; Source:Huawei Technologies; Title:pCR TS 32.255 Charging for support of Network Slicing; Document for: Approval.

S5-185393 R15 CR 32.290 Introduce Use of NRF Framework; 3GPP TSG-SA5 Meeting #120; Belgrade, Serbia, Aug. 20-24, 2018 Revision of S5-185215; CR-Form-v11.2; Change Request.

S5-185464; 3GPP TSG SA WG5 (Telecom Management) Meeting #120; Aug. 20-24, 2018, Belgrade (Serbia) revision of S5-185316;Source:Nokia, Nokia Shanghai Bell; Title:pCR TS 32.255 Introduce CHF selection; Document for:Approval.

Condoluci, M., Gallo, L., Mussot, L., Kousaridas, A., Spapis, P., Mahlouji, M., & Mahmoodi, T. (2019). 5G V2X system-level architecture of 5GCAR project. Future Internet, 11 (10), 217. doi:http://dx.doi.org/10.3390/fi 11100217.

\* cited by examiner

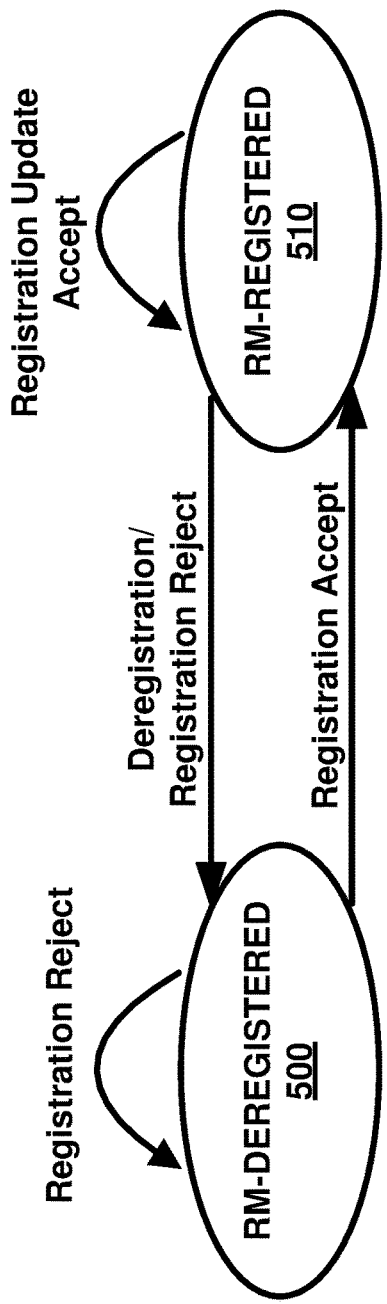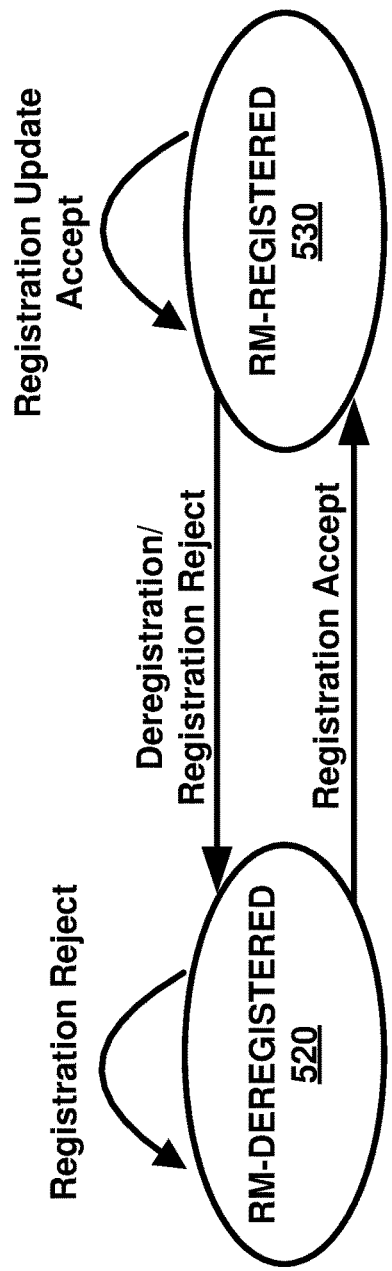
FIG. 5A
FIG. 5B

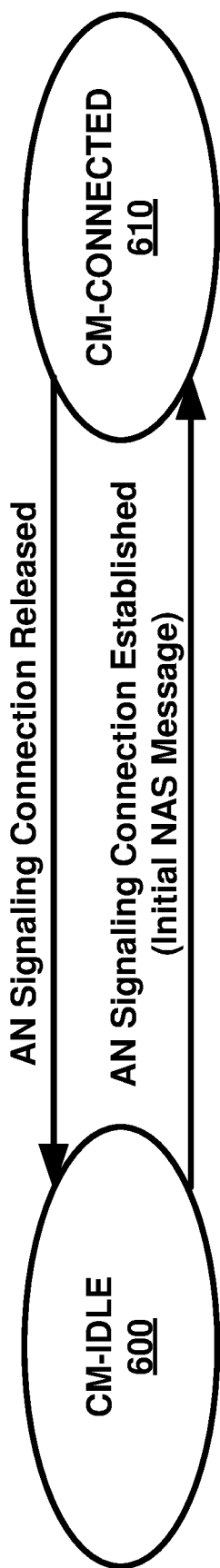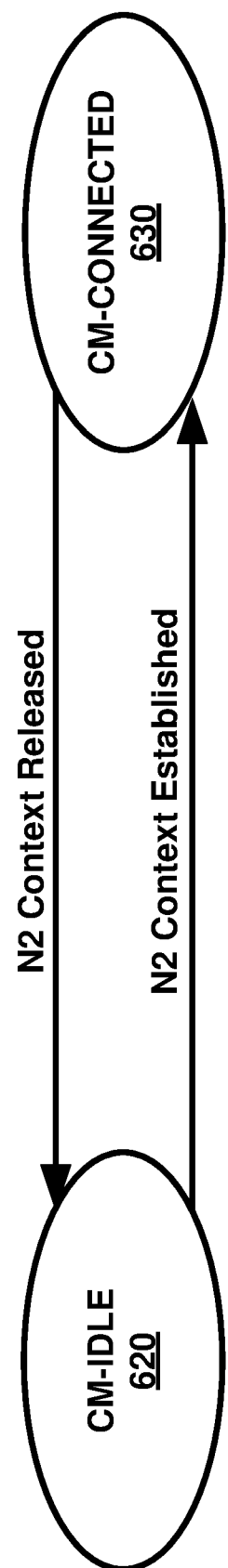

```
<xs:annotation>
<xs:documentation>==================================</xs:documentation>
<xs:documentation>Definition of Groups</xs:documentation>
<xs:documentation>==================================</xs:documentation>
</xs:annotation>

<xs:element name="ChargingMethod" type="xs:unsignedInt" />
<xs:element name="ChargingRate" type="xs:string" />
<xs:element name=" AddressOfCHF" type="xs:hexBinary " />
<xs:group name="ChargingPolicyInformation">
  <xs:sequence>
    <xs:element ref="ChargingMethod" />
    <xs:element ref="ChargingRate" />
    <xs:element ref="AddressOfCHF" />
  </xs:sequence>
</xs:group>
```

FIG. 13

CHARGING POLICY INFORMATION FOR A PACKET DATA UNIT SESSION OF A WIRELESS DEVICE

CROSS-REFERENCE TO RELATED APPLICATIONS

This application is a continuation of U.S. patent Ser. No. 16/564,236, filed Sep. 9, 2019, which claims the benefit of U.S. Provisional Application No. 62/730,850, filed Sep. 13, 2018, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 13 is a diagram depicting an example definition of information element for charging policy information as per an aspect of an embodiment of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to policy and charging control (e.g. for 5G or future communication system). Throughout the present disclosure, UE, wireless device, and mobile device are used interchangeably.

Figure 1:
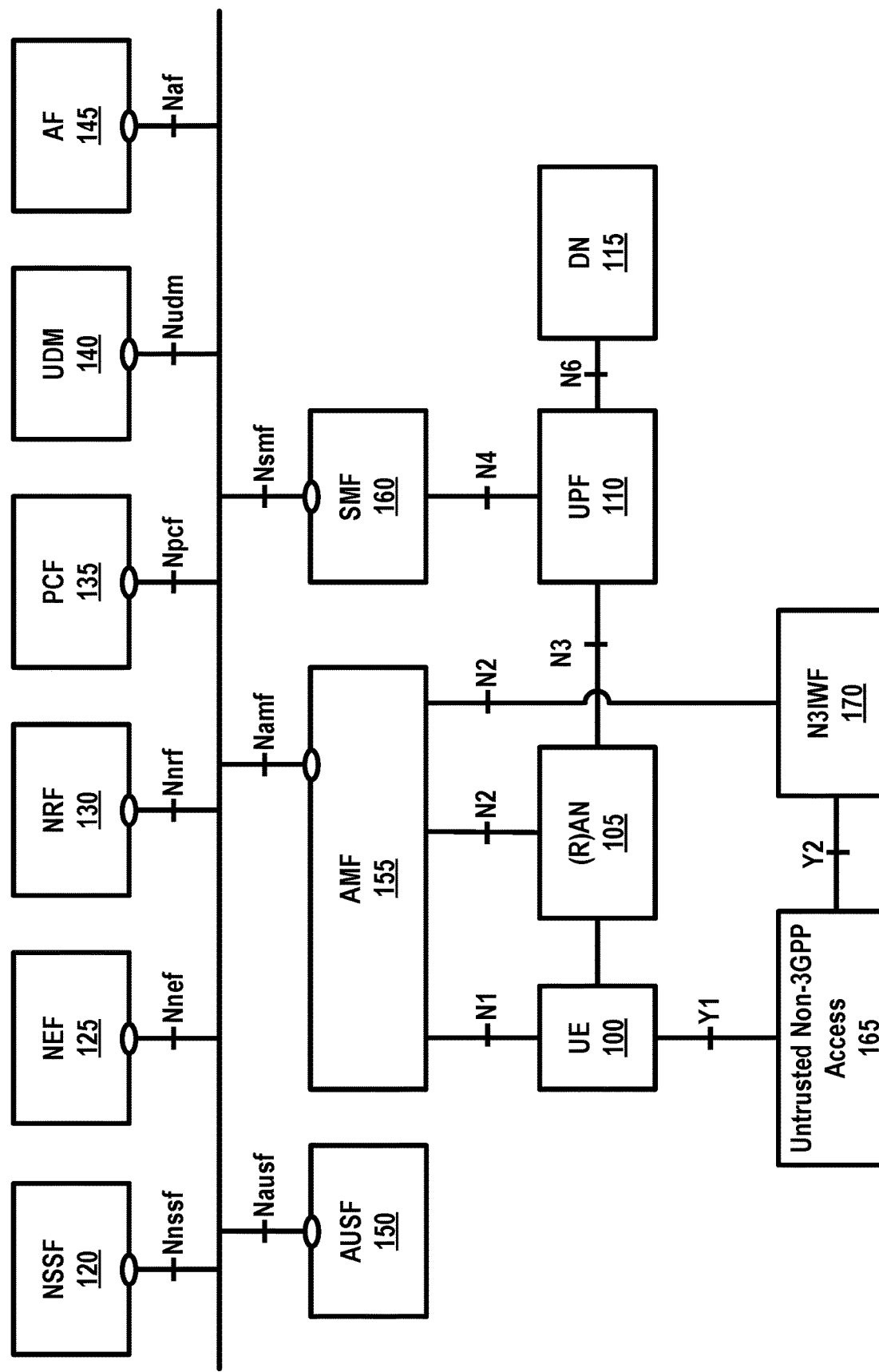
FIG. 1 is a diagram of an example 5G system architecture as per an aspect of an embodiment of the present disclosure.
Figure 2:
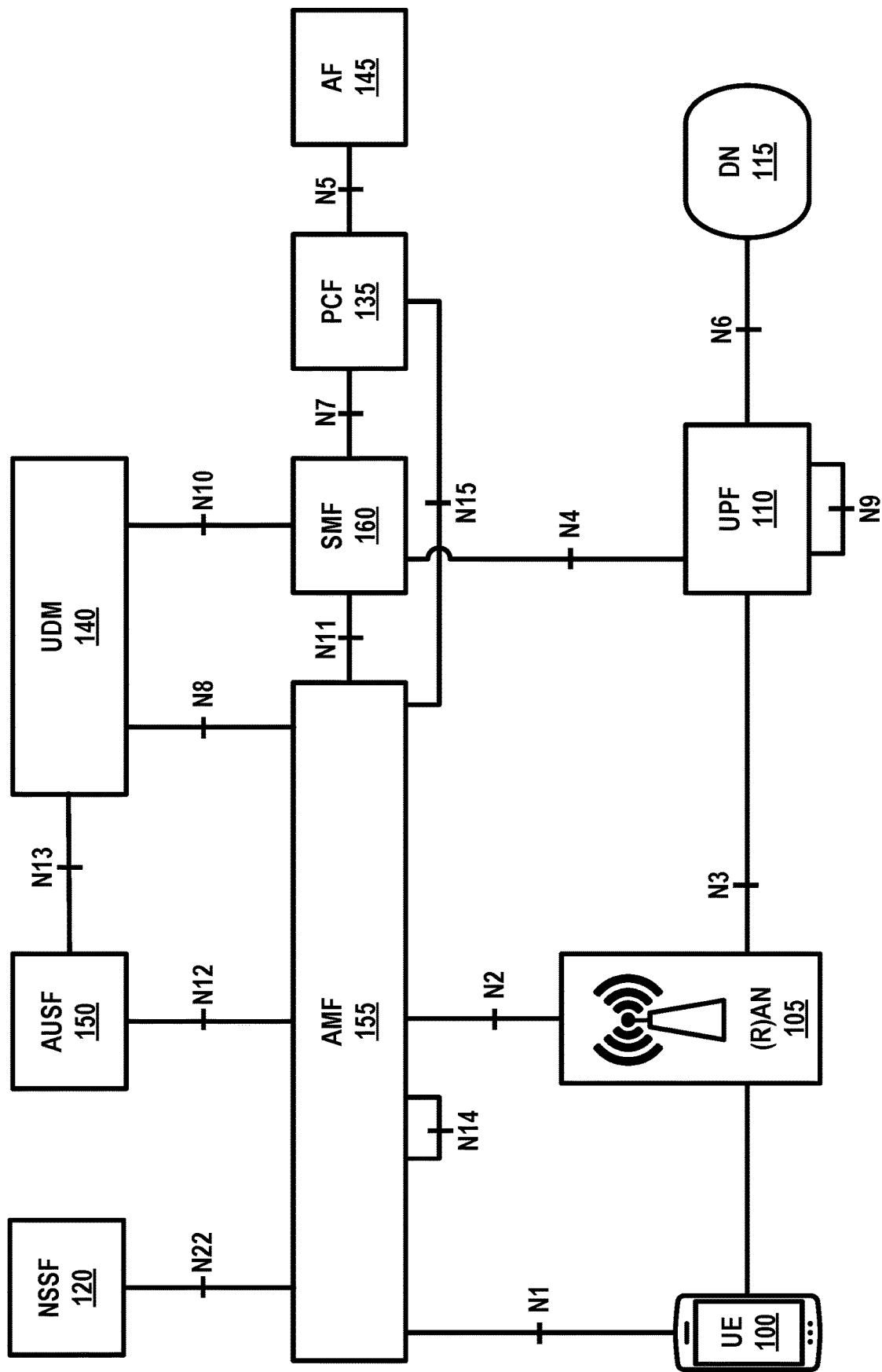
FIG. 2 is a diagram of an example 5G System architecture as per an aspect of an embodiment of the present disclosure.

The following acronyms are used throughout the present disclosure:
5G 5th generation mobile networks
5GC 5G Core Network
5GS 5G System
5G-AN 5G Access Network
5QI 5G QoS Indicator
AF Application Function
AMBR Aggregate Maximum Bit Rate
AMF Access and Mobility Management Function
AN Access Network
APN Access Point Name
ARP Allocation and Retention Priority
BD Billing Domain
CDR Charging Data Record
CHF Charging Function
CN Core Network
CP Control Plane
DDoS Distributed Denial of Service
DL Downlink
DN Data Network
DN-AAA Data Network Authentication Authorization and Accounting
DNN Data Network Name
EPS Evolved Packet System
FDD Frequency Division Duplex
FQDN Fully Qualified Domain Name
GPSI Generic Public Subscription Identifier
GW Gateway
HTTP Hypertext Transfer Protocol
ID Identifier
IMS IP Multimedia core network Subsystem
IP Internet Protocol
IP-CAN IP Connectivity Access Network
L2 Layer 2 (data link layer)
L3 Layer 3 (network layer)
LADN Local Area Data Network
LAN local area network
MAC Media Access Control
MICO Mobile Initiated Connection Only
N3IWF Non-3GPP InterWorking Function
NAS Non Access Stratum
NAT Network address translation
NEF Network Exposure Function
NF Network Function
NR New Radio
NG-RAN NR Radio Access Network NRF Network Repository Function
NSI Network Slice Instance
NSSAI Network Slice Selection Assistance Information
NSSF Network Slice Selection Function
NWDAF Network Data Analytics Function
OAM Operation Administration and Maintenance
PCC Policy and Charging Control
PCF Policy Control Function
PDU Packet Data Unit
PEI Permanent Equipment Identifier
PLMN Public Land Mobile Network
QFI QoS Flow Identifier
QoS Quality of Service
RA Random Access
RAN Radio Access Network
RAT Radio Access Technology
RRC Radio Resource Control
RM Registration Management
SBA Service Based Architecture
SM Session Management
SMF Session Management Function
SMSF SMS Function
S-NSSAI Single Network Slice Selection Assistance information
SS Synchronization Signal
SSC Session and Service Continuity
SUPI Subscriber Permanent Identifier
TA Tracking Area
TAI Tracking Area Identity
TCP Transmission Control Protocol
UDR Unified Data Repository
UDM Unified Data Management
UDP User Datagram Protocol
UE User Equipment
UL Uplink
UL CL Uplink Classifier
UPF User Plane Function
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
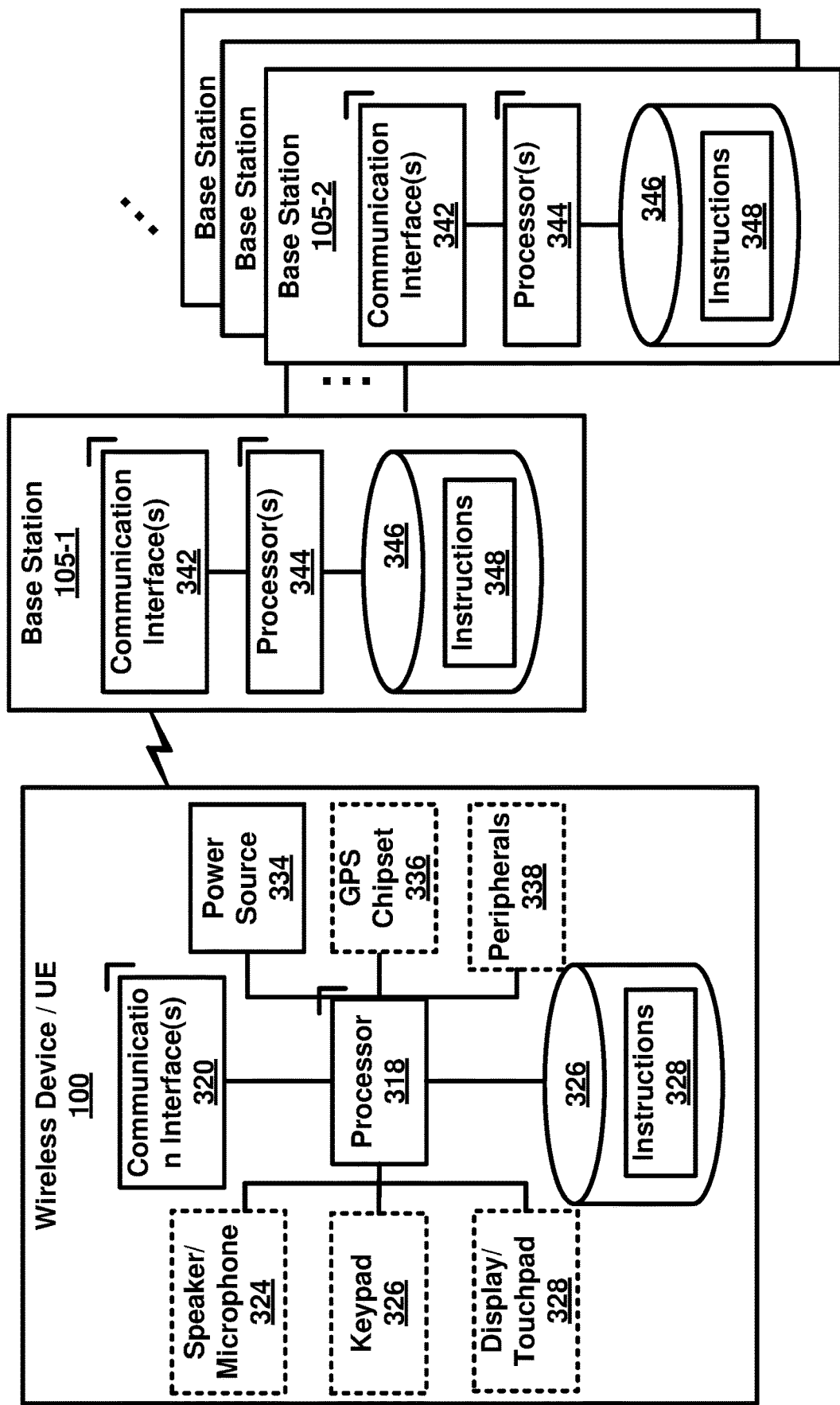
FIG. 3 is a system diagram of an example wireless device and a network node in a 5G system as per an aspect of an embodiment of the present disclosure.
Figure 4:
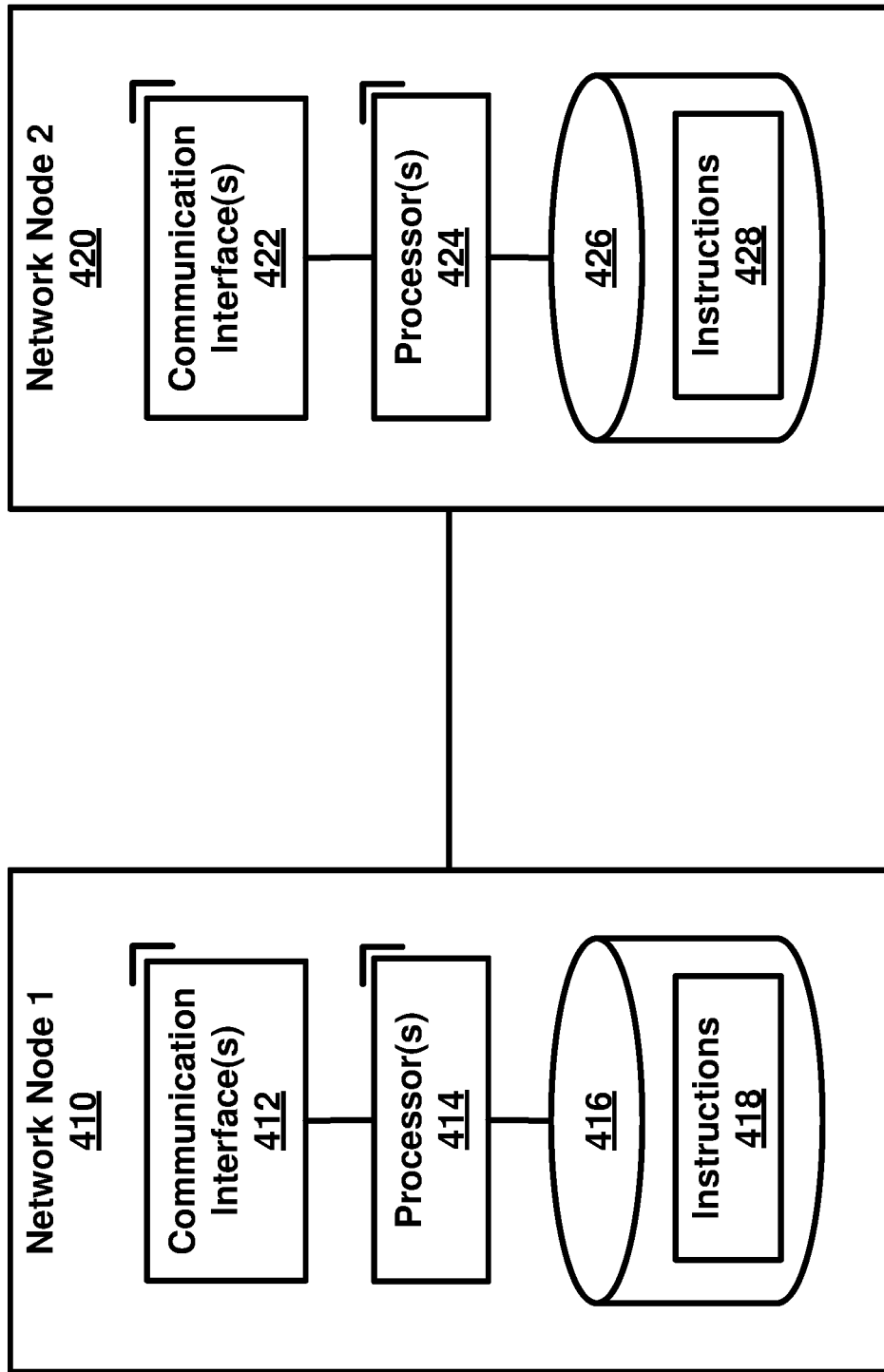
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of an SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS, lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
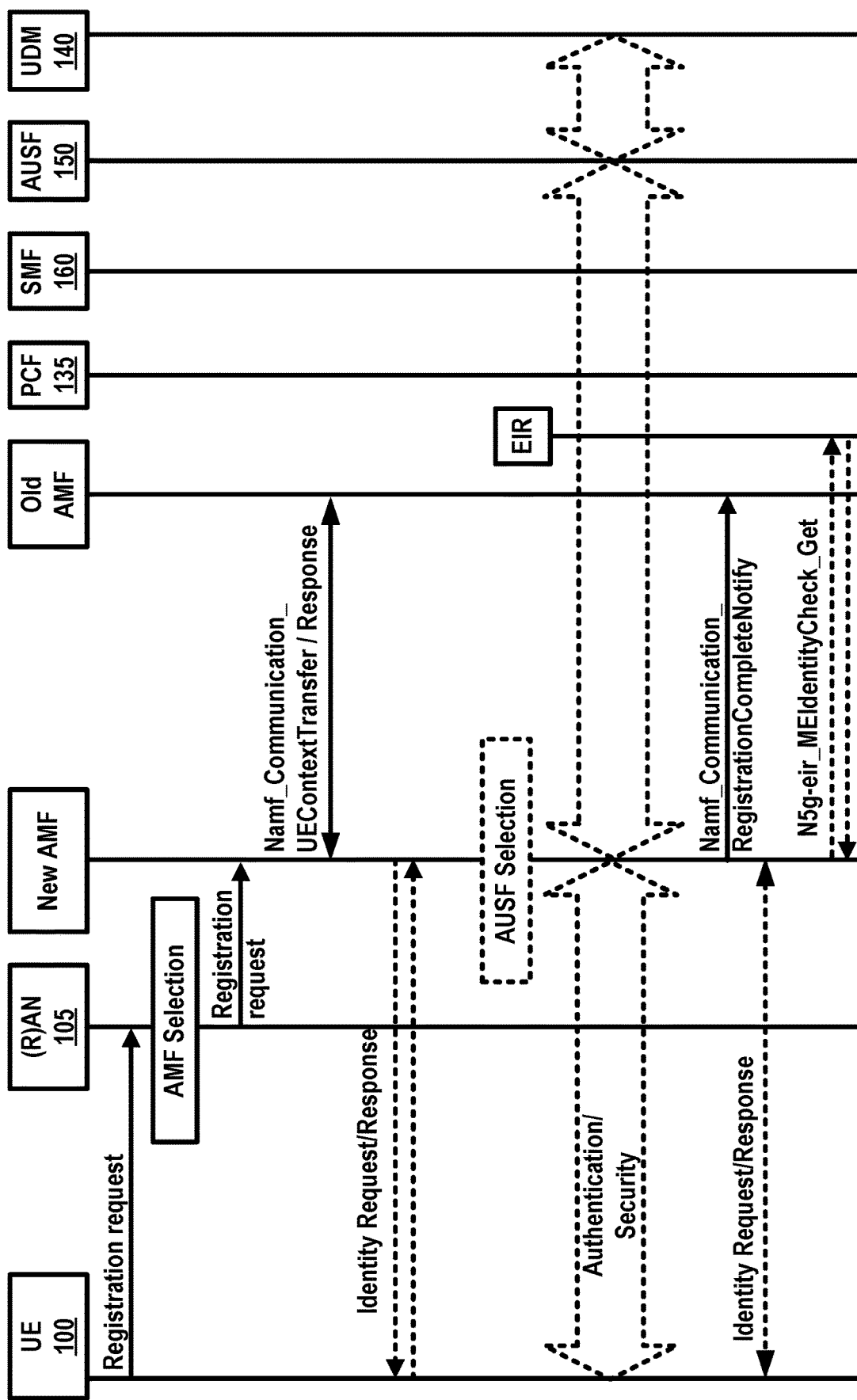
FIG. 8 and FIG. 9 is an example call flow for registration procedure as per an aspect of an embodiment of the present disclosure.
Figure 9:
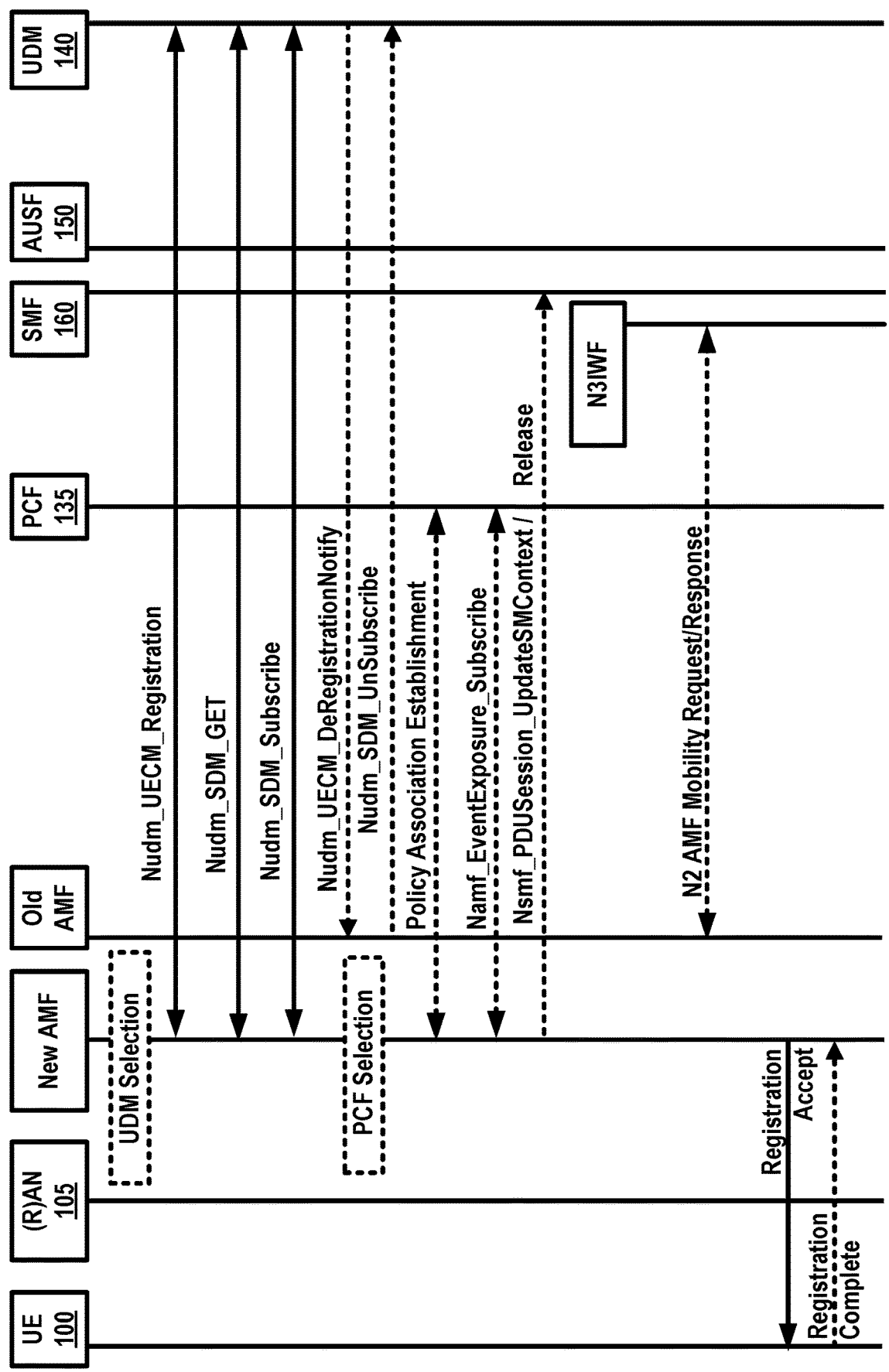

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
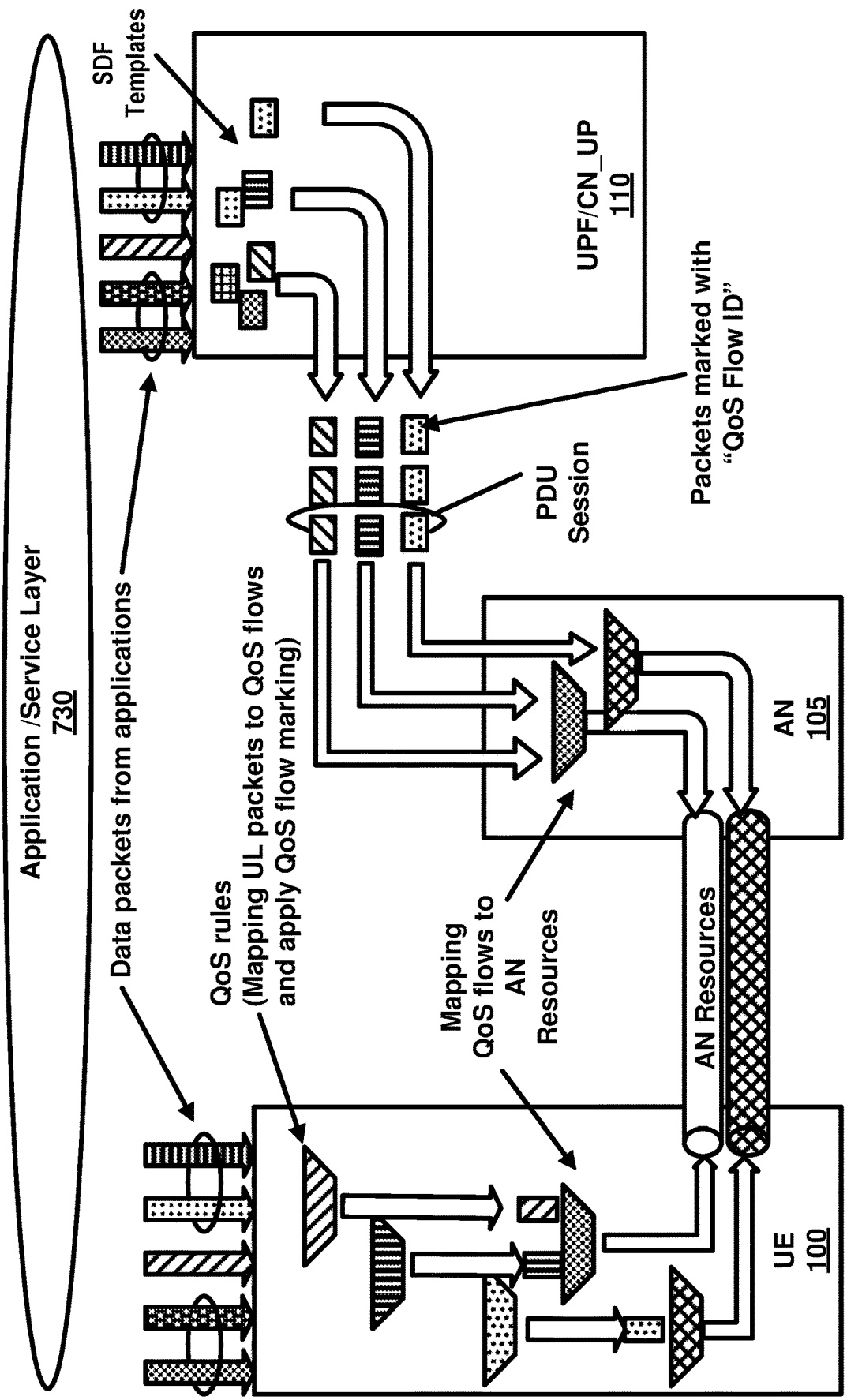
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI.

In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection, requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request). In an example, if the UE's 5G-GUTI was included in the registration request and the serving AMF 155 has changed since last registration procedure, the new AMF 155 may invoke the Namf_Communication_UEContextTransfer service operation on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure may be initiated by the AMF 155 sending an identity request message to the UE 100 requesting the SUCI.

In an example, the UE 100 may respond with an identity response message including the SUCI. The UE 100 may derive the SUCI by using the provisioned public key of the HPLMN.

In an example, the AMF 155 may decide to initiate UE 100 authentication by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check by invoking the N5g-eir_EquipmentIdentityCheck_Get service operation.

In an example, the new AMF 155, based on the SUPI, may select a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get. The UDM 140 may retrieve this information from UDR by Nudr_UDM_Query (access and mobility subscription data). After a successful response is received, the AMF 155 may subscribe to be notified using Nudm_SDM_Subscribe when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160*s* of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select a PCF 135.

In an example, the new AMF 155 may perform a policy association establishment during registration procedure. If the new AMF 155 contacts the PCF 135 identified by the (V-)PCF ID received during inter-AMF 155 mobility, the new AMF 155 may include the PCF-ID in the Npcf_AMPolicyControl_Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation for UE 100 event subscription.

In an example, the AMF 155 may send to the SMF 160 an Nsmf_PDUSession_UpdateSMContext. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response.

In an example, the new AMF 155 may send to the UE 100 a registration accept (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete message. In an example, the UE 100 may send the registration complete message to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
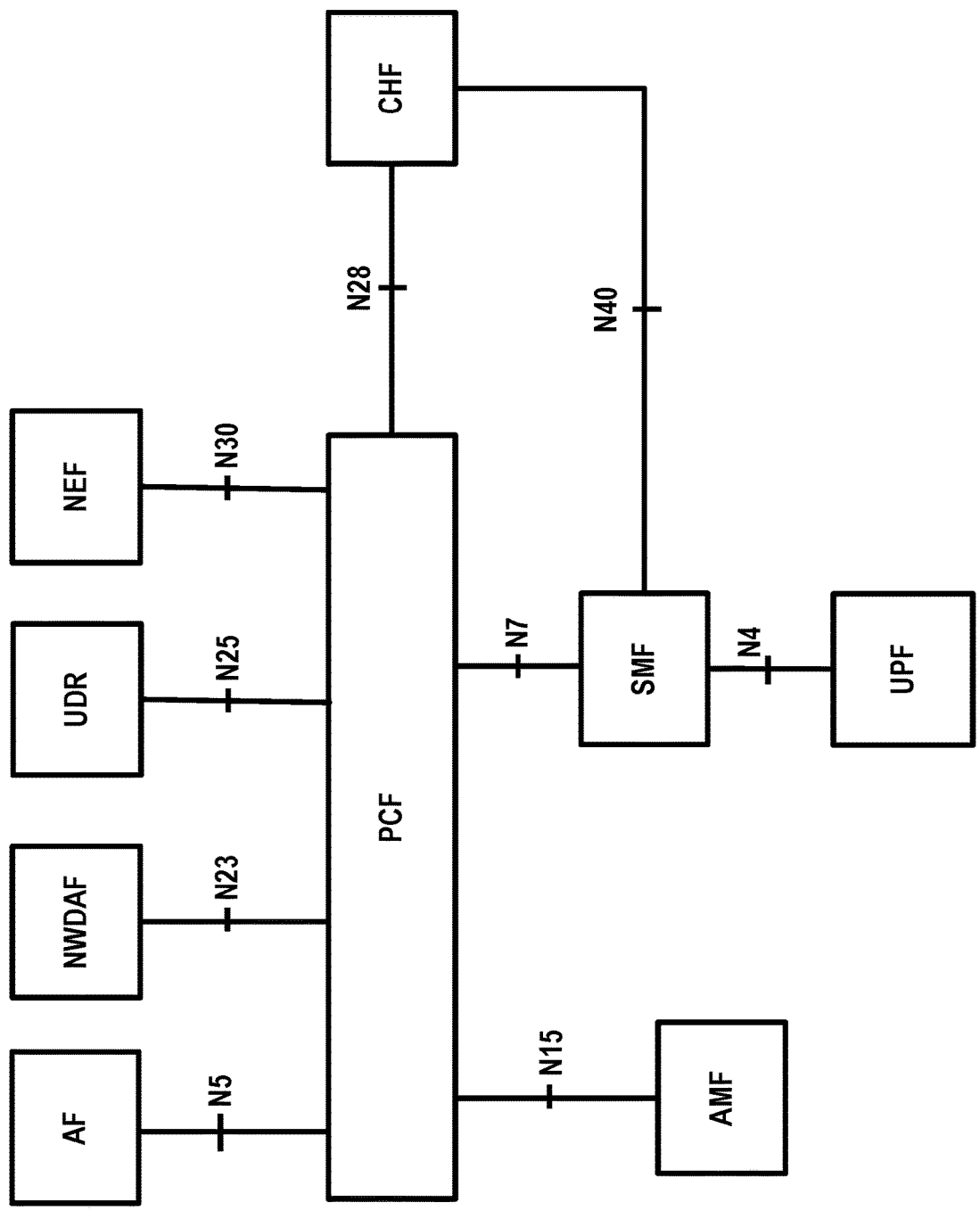
FIG. 10 is a diagram of an example 5G policy and charging control system architecture as per an aspect of an embodiment of the present disclosure.

In an example, FIG. 10 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

As an example, the CHF may support at least one charging method: offline charging, online charging, or converged charging.

As an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. As an example conclusion, offline charging may be a mechanism where charging information does not affect, in real-time, the service rendered.

As an example, online charging may be a process where charging information for network resource usage may be collected concurrently with that resource usage in the same fashion as in offline charging. However, authorization for the network resource usage may be obtained by the network prior to the actual resource usage to occur. As an example, the charging information utilized in online charging may be not necessarily identical to the charging information employed in offline charging. As an example conclusion, online charging may be a mechanism where charging information may affect, in real-time, the service rendered and therefore a direct interaction of the charging mechanism with the control of network resource usage may be required.

As an example, converged charging may be a process where online and offline charging may be combined.

Figure 11:
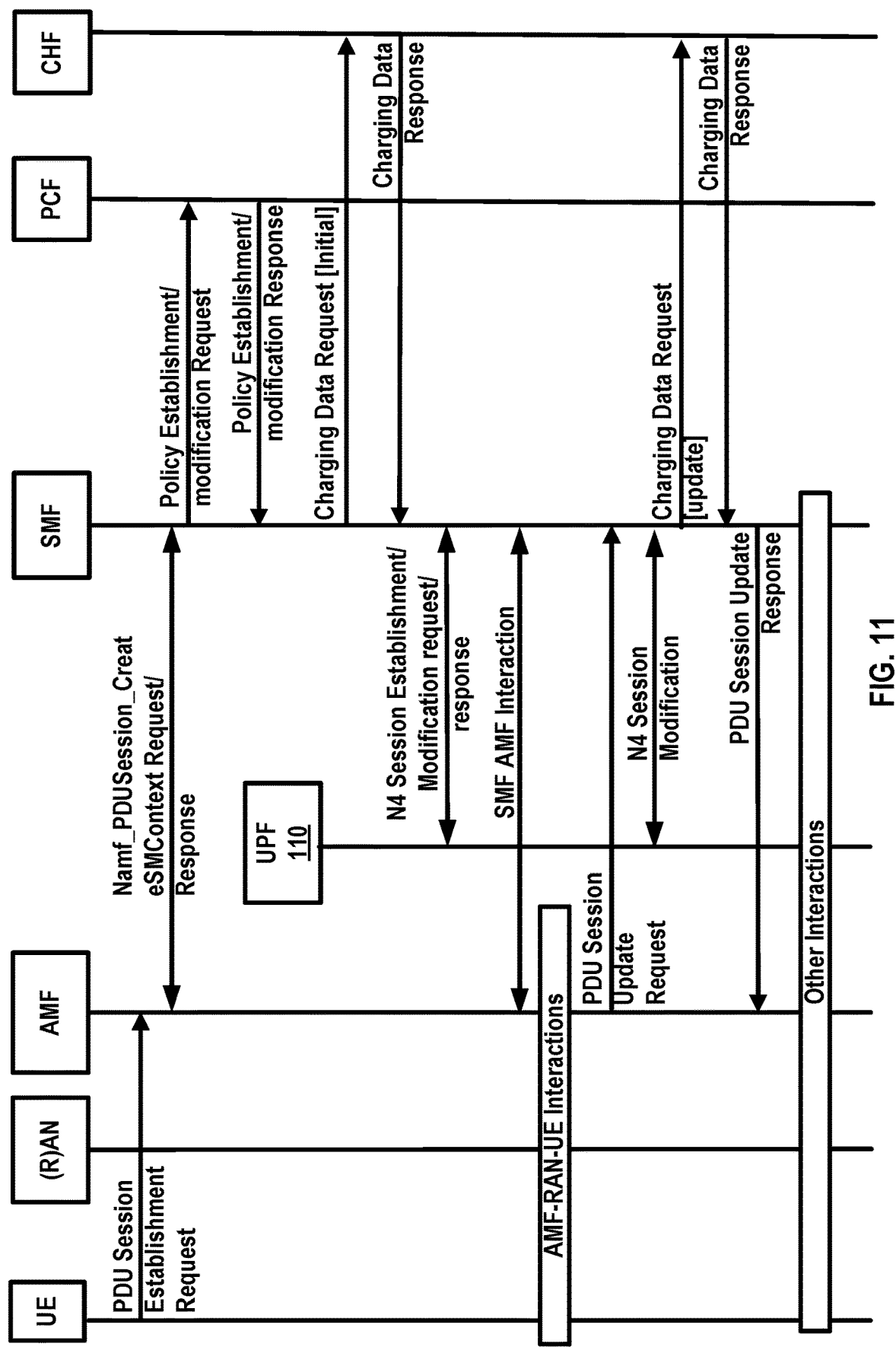
FIG. 11 is an example call flow for PDU session establishment charging as per an aspect of an embodiment of the present disclosure.

FIG. 11 is an example call flow for PDU session establishment charging as per an aspect of an embodiment of the present disclosure.

In an example, a UE may initiate a PDU Session establishment procedure comprising one or more of: PDU Session ID, PDU Type, SSC mode, User location information and Access Technology Type Information.

In response to the message received from the UE, an AMF may select an SMF and send to the selected SMF a message (e.g. Namf_PDUSession_CreateSMContext Request), the SMF may send to the AMF a response message (e.g. Namf_PDUSession_CreateSMContext Response).

In an example, the SMF may select a PCF and send to the PCF a message (e.g. SM Policy Association Establishment Request) to request PCC rules, and the PCF may provide PCC rules in a response message (e.g. SM Policy Association Establishment response).

In an example, the SMF may create a Charging Id for the PDU session and may send a Charging Data Request[initial] message to a CHF for authorization for the subscriber to start the PDU session which is triggered by start of PDU session charging event.

In an example, the CHF may open CDR for this PDU session and may acknowledge by sending Charging Data Response [Initial] to the SMF.

In an example, the SMF select a UPF and may initiate an N4 Session Establishment/Modification procedure with the selected UPF.

The SMF may interact with the AMF, in an example, the SMF may send to the AMF a Namf_Communication_N1N2MessageTransfer message comprising one or more of: PDU Session ID, QoS Profile(s), CN Tunnel Info, and S-NSSAI from the Allowed NSSAI.

In an example, the AMF may interact with (R)AN and UE by sending to the (R)AN a N2 PDU Session Request message comprising the information received from the SMF, indicating the PDU session establishment is accepted.

In an example, the (R)AN may send to the AMF a N2 PDU Session Response message comprising one or more of: PDU Session ID, N2 SM information (PDU Session ID, AN Tunnel Info, List of accepted/rejected QFI(s)), wherein the AN Tunnel Info may be corresponding to the Access Network address of the N3 tunnel corresponding to the PDU Session.

In an example, the AMF may send to the SMF a Nsmf_PDUSession_UpdateSMContext Request message comprising the N2 SM information received from (R)AN to the SMF.

In an example, the SMF may initiate an N4 Session Modification procedure with the UPF. The SMF may provide AN Tunnel Info to the UPF as well as the corresponding forwarding rules. The UPF may send to the SMF a response message.

In an example, the SMF may request quota from CHF, e.g. "start of service data flow" event may need quota from CHF. The SMF may send a message to the CHF (e.g. Charging Data Request [update]). As an example, for online charging or converged charging, the SMF may request quota from CHF when allocated quota is consumed or a trigger is met to request a quota.

As an example, the UPF may report resource usage of a PDU session to the SMF. As an example, the UPF may report resource usage of a wireless device to the SMF, by enforcing the charging control rules, the SMF may send to the CHF a message (e.g. Charging Data Request [update]) comprising resource usage information received from the UPF.

In an example, the CHF may update CDR for this PDU session. The CHF may acknowledge the SMF by sending a Charging Data Response message.

In an example, the SMF may send to the AMF a Nsmf_PDUSession_UpdateSMContext Response message.

In an example, other interactions may be performed between SMF, AMF, (R)AN and UE for the PDU session establishment procedure.

Implementation of the existing technologies may have issues in supporting charging control. The existing technologies may have issues that where and how a PCF receive charging related information. The existing technologies may have issues that how the PCF select a CHF. The existing technologies may have issues that how the CHF determine a charging method (e.g. online charging, offline charging, or converged charging). Example embodiments provides the enhanced mechanisms to indicate charging policy information from a CHF to a PCF. Example embodiments provides the enhanced mechanisms to indicate charging policy information from a network function to a PCF. Example embodiments provides the enhanced mechanisms that the PCF makes policy decision based on the received charging policy information. Example embodiments provides the enhanced mechanisms to indicate charging type from an SMF to a CHF. Example embodiments provides the enhanced mechanisms to select a CHF by the PCF. Example embodiments provides the enhanced mechanisms that the CHF determines a charging method.

In existing systems, a PCF may send a charging control rule to an SMF. Implementation of the existing technologies does not provide charging control information to the PCF to determine charging control rule. Implementation of the existing technologies may have issues that how a charging function (CHF), a PCF and an SMF coordinated rightly. With implementation of existing signaling methods, the PCF may not be coordinated with the CHF and may select an improper charging method. Implementation of the existing technologies does not provide flexibility in configuring various types of charging control by the PCF. CHF may have various charging methods, and there is a need to dynamically coordinate the charging method between a CHF and a PCF.

Example embodiments provides enhanced mechanisms to coordinate charging policy information between a CHF and a PCF. In an example embodiment, a PCF may make policy decisions based on received charging policy information from a CHF. Example embodiments provides an enhanced method in configuring various types of charging control by the PCF. Example embodiments provides an enhanced method to select a proper charging method by the PCF. Example embodiments provides an enhanced method for selecting a CHF by the PCF.

Figure 12:
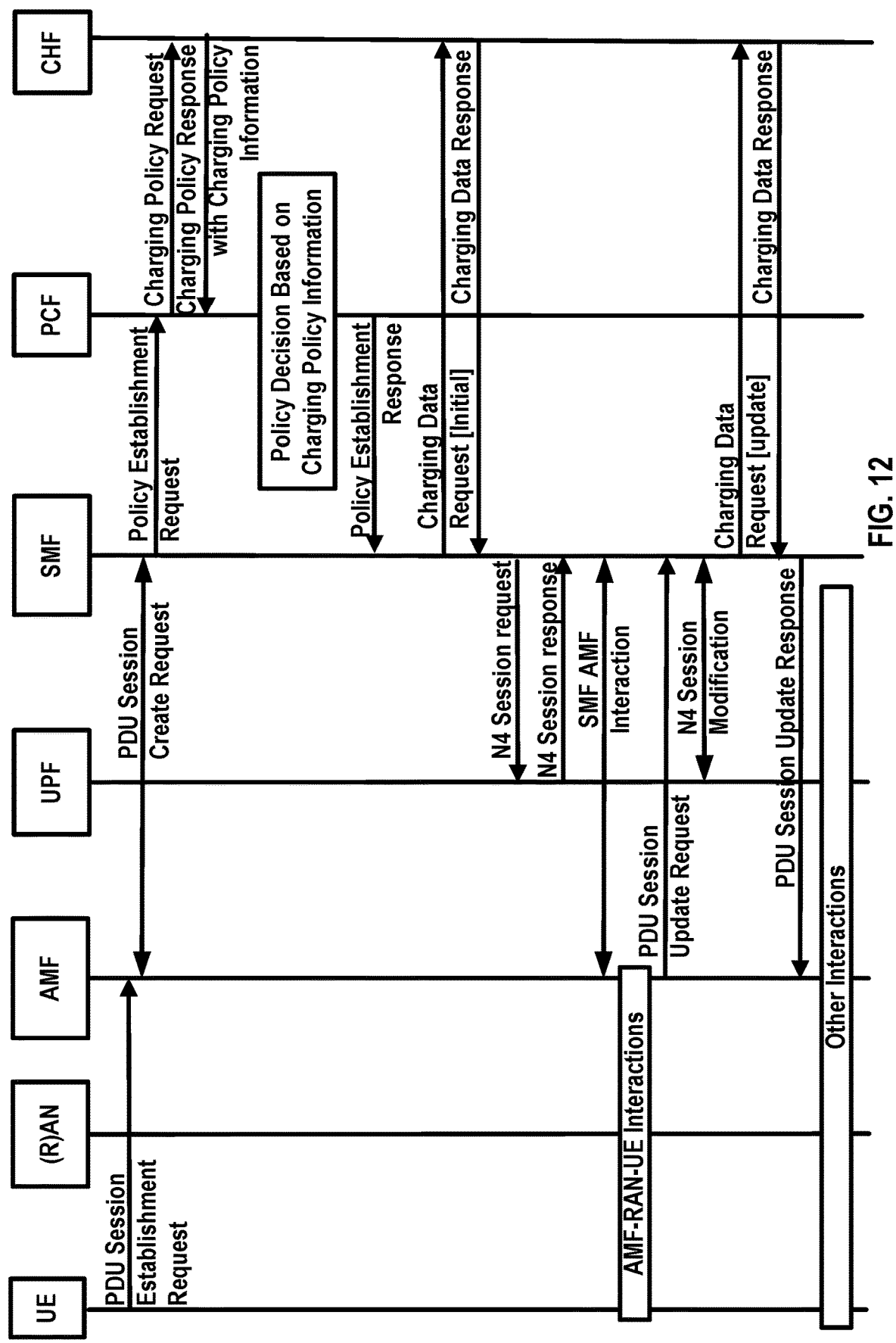
FIG. 12 is an example call flow of PCF makes policy decision based on charging policy information received from a CHF as per an aspect of an embodiment of the present disclosure.

In an example, a UE may initiate a PDU session establishment procedure, during the procedure, a PCF may send a message to a CHF requesting charging policy information. The CHF may send charging policy information to the PCF, the PCF may make policy decision based on the received charging policy information. FIG. 12 shows an example call flow which may comprise one or more actions.

A UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. The PDU session establishment request message may comprise at least one of: a PDU session ID, Requested PDU Session Type, or a Requested SSC mode, etc. In response to the message received from the UE, the AMF may select an SMF and send to the SMF a message (e.g. PDUSession_CreateSMContext Request) comprising at least one of: SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). As an example, the PCF identifier may be an identifier, or an IP address, or FQDN to identify the PCF. In response to the message received from the AMF, the SMF may send to the AMF a response message (e.g. PDUSession_CreateSMContext Response) comprising at least one of: Cause, SM Context ID or N1 SM container (PDU Session Reject (Cause)).

If dynamic PCC is deployed and a PCF ID is provided by the AMF, the SMF may performs PCF selection procedure by selecting a PCF (e.g. based on the PCF identifier received). The SMF may perform an SM Policy Association Establishment procedure to establish a PDU Session with the selected PCF and get the default PCC Rules for the PDU Session. The PDU session may be identified by the PDU Session ID. The message sent to the PCF by the SMF may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF).

In response to the message received from the SMF, the PCF may select a CHF based on the information received from the SMF, and/or the UE subscription information received from a UDR, and/or local configuration and operator policies, and/or other information for the PDU session. As an example, the PCF may select a CHF based on one or more combination information received from the SMF. As an example, the PCF may select a CHF based on the PLMN identifier received from the SMF. As an example, the PCF may select a CHF based on the network slice information (e.g. S-NSSAI(s) and/or network slice instance identifier(s)). As an example, the PCF may select a CHF based on the user location information. As an example, the PCF may select a CHF based on the information of the SMF. As an example, the PCF may select a CHF based on the Access Type and the RAT type received from the SMF.

Figure 19:
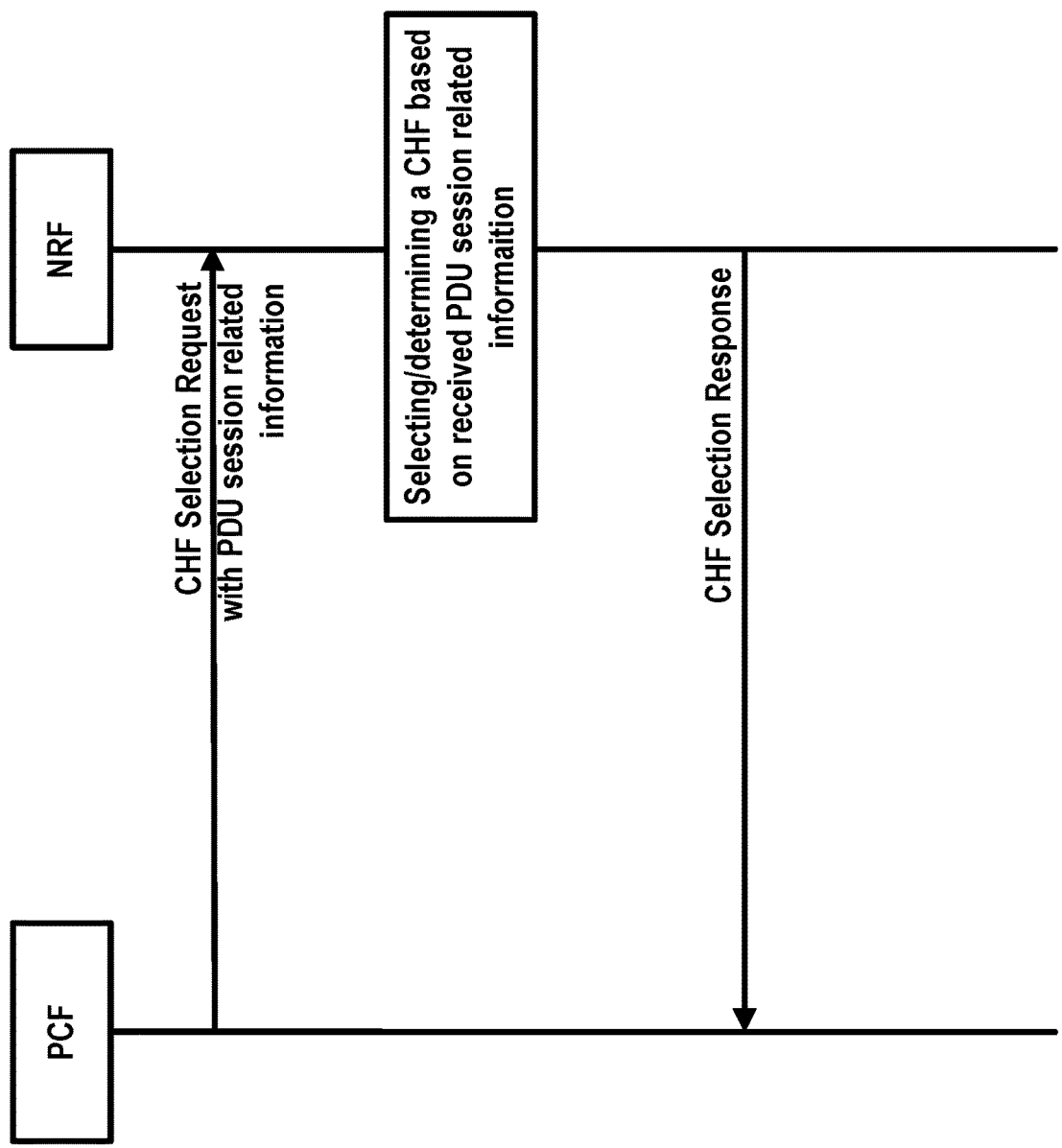
FIG. 19 is an example call flow of selecting a CHF by an NRF as per an aspect of an embodiment of the present disclosure.

In an example, the PCF may select a CHF by an NRF. FIG. 19 is an example call flow of selecting a CHF by an NRF, which may one or more of the following actions:

The PCF may send to an NRF a message (e.g. a CHF Selection Request message, or a Nnrf_NFDiscovery_Request message) comprising an information element indication a request to select a CHF. The message sent from the PCF to the NRF may comprise PDU session related information. The PDU session related information may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); the PLMN identifier; an application identifier; the DNN, the S-NSSAI(s) and/or network slice instance identifier(s), the PDU Session ID, the user location information, the information of the SMF for the PDU session (e.g. SMF identifier, IP address and/or FQDN of the SMF), or the information of the PCF (e.g. PCF identifier, IP address and/or FQDN of the PCF).

In response to the message received from the PCF, the NRF may determine/select at least one CHF based on the information received from the PCF, and/or the UE subscription information received from a UDR, and/or local configuration and operator policies, and/or other information for the PDU session. As an example, the NRF may select a CHF based on one or more combination information received from the PCF. As an example, the NRF may select a CHF based on the UE IP address (e.g. UE IPv4 address and/or UE IPv6 network prefix). As an example, the NRF may select a CHF based on the Type of PDU Session (e.g. IPv4, IPv6, IPv4v6, Ethernet, Unstructured). As an example, the NRF may select a CHF based on the PDU Session ID. As an example, the NRF may select a CHF based on the Access Type and/or the RAT type. As an example, the NRF may select a CHF based on the application identifier. As an example, the NRF may select a CHF based on the information of the SMF for the PDU session (e.g. SMF identifier, IP address or FQDN of the SMF). As an example, the NRF may select a CHF based on the user location information. As an example, the NRF may select a CHF based on the information of the PCF (e.g. PCF identifier, IP address and/or FQDN of the PCF). The NRF may send to the PCF a message (e.g. a CHF Selection Response message, or a Nnrf_NFDiscovery_Request Response message) comprising the information of the at least one selected CHF (e.g. CHF identifier, IP address and/or FQDN of the at least one selected CHF).

The PCF may send to the CHF a message (e.g. charging policy request) requesting one or more charging policy information. The message sent to the CHF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, the user location information, the information of the SMF for the PDU session (e.g. SMF identifier, IP address or FQDN of the SMF), or the PCF identifier.

In response to the message received from the PCF, the CHF may determine/generate/create/derive charging policy information based on the information received from the PCF. The charging policy information may comprise at least one of: an information element indicating a first charging method/charging type, wherein the first charging method/charging type may comprise at least one of: online charging, offline charging, or converged charging; an information element indicating at least one first charging rate; or an information element indicating at least one first identifier or address of a CHF. The first charging method/charging type and/or first charging rate may be applied to at least one of: a PDU session identified by a PDU session identifier; a service data flow identified by at least one service data flow filter; an application identified by an application identifier; a wireless device identified by at least one user identity (e.g. SUPI, PEI, and/or GPSI); a data network identified by a DNN; or a network slice identified by a S-NSSAI and/or a network slice instance identifier.

As an example, the CHF may determine charging policy information based on the UE identity, e.g. the CHF may determine an online charging and/or a charging rate and/or an IP address (e.g. IPv4 address and/or IPv6 network prefix) of CHF for an SUPI. As an example, the CHF may determine charging policy information based on the type of PDU session, e.g. the CHF may determine an offline charging and/or a flat charging rate and/or an IPv4 address of CHF for an IPv4 type PDU session. As an example, the CHF may determine charging policy information based on the Access Type and/or the RAT Type, e.g. the CHF may determine an online charging and/or a charging rate and/or an IP address (e.g. IPv4 address and/or IPv6 network prefix) of CHF for an 3GPP access and/or 3GPP-NR-FDD RAT type. As an example, the CHF may determine charging policy information based on the PLMN identifier, e.g. the CHF may determine an offline charging and/or a flat charging rate and/or an FQDN of CHF for an PLMN identifier "12345". As an example, the CHF may determine charging policy information based on the application identifier, e.g. the CHF may determine an online charging and/or a charging rate and/or an identifier of CHF for an application identifier "skype". As an example, the CHF may determine charging policy information based on the DNN, e.g. the CHF may determine an offline charging and/or a flat charging rate and/or an IPv4 address of CHF for an DNN "IMS". As an example, the CHF may determine charging policy information based on the DNN, e.g. the CHF may determine an offline charging and/or a flat charging rate and/or an IPv4 address of CHF for an DNN "IMS". As an example, the CHF may determine charging policy information based on the network slice, e.g. the CHF may determine an online charging and/or a charging rate and/or an IPv6 network prefix of CHF for an S-NSSAI and/or network slice instance(s). As an example, the CHF may determine charging policy information based on the PDU session identifier, e.g. the CHF may determine an online charging and/or a charging rate and/or an IPv4 address of CHF for an PDU session identifier "PDU session 1". As an example, the CHF may determine charging policy information based on the user location information, e.g. the CHF may determine an offline charging and/or a charging rate and/or an IP address (e.g. IPv4 address and/or IPv6 network prefix) of CHF for a wireless device located within "registration area 1".

The CHF may send a response message (e.g. charging policy response) to the PCF comprising the determined charging policy information. The message sent to the PCF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID.

As an example, HTTP protocol may be used for the communication between the CHF and the PCF. FIG. 13 shows example definitions of information element for the charging policy information comprising charging method, charging rate and address of CHF, wherein XML structure of simple elements and/or groups may be used as HTTP message content. As an example, the transaction (e.g. a charging policy request message and a charging policy response message) between PCF and CHF may establish a charging control session between the PCF and the CHF. The PCF and the CHF may establish a charging control session for a wireless device, and/or a PDU session, and/or a DNN, and/or a network slice.

In response to the message received from the CHF, the PCF may make policy decision based on the received charging policy information, and may determine/generate/create/derive one or more PCC rules comprising one or more charging control rules, the one or more PCC rules and/or the one or more charging control rules may apply to at least one PDU session identified by a PDU session identifier, and/or at least one service data flow identified by at least one service data flow filter, and/or at least one application identified by an application identifier, and/or a wireless device identified by a UE identity, and/or a data network identified by a DNN, and/or a network slice identified by an S-NSSAI and/or a network slice instance identifier.

Each of the PCC rule determined by the PCF may comprise at least one of: at least one charging control rule; at least one policy control rule comprising at least one QoS control rule and/or at least one gating control rule; at least one usage monitoring control rule; at least one application detection and control rule; at least one traffic steering control rule; or at least one service data flow detection information (e.g. service data flow template).

As an example, the charging control rule may be used for charging control and may comprise at least one of: an information element indicating a second charging method/charging type, wherein the second charging method/charging type may comprise at least one of: online charging, offline charging, or converged charging; an information element indicating at least one second charging rate; or an information element indicating at least one second identifier or address of a CHF.

As an example, the policy control rule may be used for policy control, wherein the at least one QoS control rule may be used for QoS control and the at least one gating control rule may be used for gating control. As an example, the QoS control rule may be used to authorize QoS on a service data flow. As an example, the gating control rule may be used to discard packets that don't match any service data flow of the gating control rule and/or associated PCC rules. As an example, the usage monitoring control rule may be used to monitor, both volume and time usage, and report the accumulated usage of network resources. As an example, the application detection and control rule may comprise a request to detect a specified application traffic, report to a PCF on a start or stop of application traffic and to apply a specified enforcement and charging actions. As an example, the traffic steering control rule may be used to activate/deactivate traffic steering policies for steering a subscriber's traffic to appropriate operator or 3rd party service functions (e.g. NAT, antimalware, parental control, DDoS protection) in an (S)Gi-LAN.

As an example, the service data flow detection information (e.g. service data flow template) may comprise a list of service data flow filters or an application identifier that references the corresponding application detection filter for the detection of the service data flow. As an example, the service data flow detection information (e.g. service data flow template) may comprise combination of traffic patterns of the Ethernet PDU traffic.

As an example, the PCF may determine charging control rules based on charging policy information and/or other information (e.g. local configuration and operator policies, or subscription information). As an example, the PCF may determine the second charging method/charging type in the charging control rule based on the first charging method/charging type in the charging policy information. The second charging method/charging type may be the same as the first charging method/charging type or may be different. As an example, the PCF may determine an online charging method in the charging control rule based on the online charging method in the charging policy information. As an example, the PCF may determine a converged charging method in the charging control rule based on the converged charging method in the charging policy information. As an example, the PCF may determine an offline charging method in the charging control rule based on a converged charging method in the charging policy information. As an example, the PCF may determine an online charging method in the charging control rule based on an offline charging method in the charging policy information and the online charging method in a local configuration and operator policies.

As an example, the PCF may determine the second charging rate in the charging control rule based on the first charging rate in the charging policy information. The second charging rate may be the same as the first charging rate or may be different. As an example, the PCF may determine a charging rate 1 in the charging control rule based on the charging rate 1 in the charging policy information. As an example, the PCF may determine a charging rate 1 in the charging control rule based on a charging rate 2 in the charging policy information and a charging rate 1 in the subscription information (e.g. from a UDR).

As an example, the PCF may determine the second identifier or address of a CHF in the charging control rule based on the first identifier or address of a CHF in the charging policy information. The second identifier or address of the CHF may be the same as the first identifier or address of a CHF or may be different. As an example, the PCF may determine an IPv4 address of a CHF in the charging control rule based on the IPv4 address of the CHF in the charging policy information. As an example, the PCF may determine an IPv6 network prefix address of a CHF in the charging control rule based on the an IPv4 address and the IPv6 network prefix address of the CHF in the charging policy information. As an example, the PCF may determine an identifier of a CHF in the charging control rule based on an FQDN of the CHF in the charging policy information.

As an example, the PCF may connect with one or more CHFs. The PCF may request to the one or more CHFs and receive charging policy information from the one or more CHFs respectively. The PCF may determine each charging control rule based on each charging policy information respectively. As an example, the PCF may determine charging control rule 1 based on charging policy information 1 received from CHF 1, and determine charging control rule 2 based on charging policy information 2 received from CHF 2. As an example, the PCF may determine charging control rule 3 and charging control rule 4 based on charging policy information 3 received from CHF 3, and determine charging control rule 5 and charging control rule 6 based on charging policy information 4 received from CHF 4.

The PCF may send to the SMF a response message (e.g. SM Policy Association Establishment Response) comprising one or more PCC rules comprising one or more charging control rules. As an example, the response message may comprise one or more PCC rules associate with one CHF (e.g. one or more PCC rules comprising one or more charging control rules may be derived from charging policy information received from CHF 1). As an example, the response message may comprise one or more PCC rules associate with more than one CHFs (e.g. PCC rule 1 comprises one or more charging control rules 1, and PCC rule 2 comprises one or more charging control rules 2, where PCC rule 1 and/or charging control rules 1 may be derived from charging policy information received from CHF 1, and PCC rule 2 and/or charging control rules 2 may be derived from charging policy information received from CHF 2. As an example, charging control rules 1 may comprise the address of CHF 1, charging control rules 2 may comprise the address of CHF 2). The response message may comprise at least one of the following information elements which the one or more PCC rules applied to: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID.

In response to the message received from the PCF, the SMF may install the one or more PCC rules and other information received. The SMF may select one of CHF and enforce charging control rules associated with the CHF by comprising one or more actions. Based on the charging control rules and other information elements, the SMF may construct a message (e.g. charging data request [initial]) and send the constructed message to the CHF to establish a charging session. The identifier or address of the CHF in the charging control rule may be used by the SMF to establish a charging session. The message sent to the CHF may comprise at least one of the following: an information element indicating a requested charging method/charging type, wherein the charging method/charging type may comprise at least one of: online charging, offline charging, or converged charging; an information element indicating at least one requested charging rate; an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the SMF may indicate to the CHF an online charging method; as an example, the SMF may indicated to the CHF an offline charging method; as an example, the SMF may indicate to the CHF a converged charging method. In response to the message received from the SMF, the CHF may verify the information received and determine whether to accept the charging session establishment request. As an example, the CHF may accept the request, and may send to the SMF a response message (e.g. charging data response). The response message may comprise at least one of the following: an information element indicating a success cause value to indicate the request is accepted; an information element indicating an accepted charging method/charging type, wherein the accepted charging method/charging type may comprise at least one of: online charging, offline charging, or converged charging; as an example, the accepted charging method/charging type may be the same as the requested charging method/charging type; an information element indicating at least one charging rate (e.g. rating group); an information element indicating at least one granted unit (e.g. granted volume and/or granted time for online charging or converged charging); an information element indicating final unit action (e.g. redirect the traffic to a web portal when the final granted unit has been consumed by the wireless device); an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the CHF may reject the request, and may send to the SMF a response message (e.g. charging data response) comprising a proposed charging method/charging type. The response message may comprise at least one of the following: an information element indicating a reject cause value to indicate the request is rejected; or an information element indicating an accepted charging method/charging type, wherein the accepted charging method/charging type proposed by the CHF may comprise at least one of: online charging, offline charging, or converged charging; as an example, the accepted charging method/charging type may be different from the requested charging method/charging type. As an example, the requested charging method may be offline charging, and the proposed accepted charging method may be converged charging.

In response to the message received from the CHF, the SMF may take different actions based on the result of the response. As an example, when receiving a reject response message from the CHF, the SMF may resend to the CHF a second request message (e.g. charging data request) comprising the accepted charging method/charging type proposed by the CHF. As an example, the requested charging method in the second request message may be set as the proposed accepted charging method in the response message (e.g. converged charging). The CHF may accept the second request by sending to the CHF a second response message (e.g. charging data response) comprising a success cause value indicating the request is accepted. As an example, when receiving a reject response message from the CHF, the SMF may select a second CHF from the information (e.g. charging policy rules) received from the PCF and send a request message (e.g. charging data request) to the second CHF to establish a charging session.

As an example, after receiving a success response message from the CHF, the SMF may enforce the PCC rules and/or charging control rules required by the PCF and/or charging function required by the CHF by determining/generating/creating/deriving at least one of the following user plane rules based on the received PCC rules and/or charging control rules from the PCF and/or the information (e.g. charging policy information) received from the CHF: at least one packet detection rule; at least one forwarding action rule; at least one QoS enforcement rule; or at least one usage reporting rule.

As an example, the packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. As an example, the forwarding action rule may comprise an apply action parameter, which may indicate whether a UP function may forward, duplicate, drop or buffer the data/traffic packet respectively. As an example, the usage reporting rule may be used to measure the network resources usage in terms of traffic data volume, duration (i.e. time) and/or events, according to a measurement method in the usage reporting rule. As an example, the QoS enforcement rule contains instructions to request the UP function to perform QoS enforcement of the user plane traffic. As an example, the SMF may determine a packet detection rule based on the service data flow detection information (e.g. service data flow template) received from the PCF. As an example, the SMF may determine a forwarding action rule based on the policy control rule and/or usage monitoring control rule received from the PCF and/or the final unit action received from the CHF. As an example, the SMF may determine a QoS enforcement rule based on the policy control rule (e.g. QoS control rule) received from the PCF. As an example, the SMF may determine a usage reporting rule based on the usage monitoring control rule received from the PCF and/or the at least one granted unit (e.g. granted volume and/or granted time for online charging or converged charging) received from the CHF.

As an example, the SMF may enforce the PCC rules and/or charging control rules required by the PCF and/or charging function required by the CHF by selecting a UPF and sending to the UPF a message (e.g. N4 session establishment/modification request) comprising the at least one of the following user plane rules: at least one packet detection rule; at least one forwarding action rule; at least one QoS enforcement rule; or at least one usage reporting rule.

In response to the message received from the SMF, the UPF may install the user plane rules, send to the SMF a response message (e.g. N4 session establishment/modification response), and enforce the user plane rules received from the SMF. As an example, the UPF may enforce the at least one packet detection rule by matching a user data/traffic packet with service data flow template (e.g. service data flow filters and/or application identifiers), and may apply other user plane rules (e.g. forwarding action rule, QoS enforcement rule, and usage reporting rule) to the data/traffic packets matched the packet detection rule. As an example, the UPF may enforce the at least one forwarding action rule by forwarding, duplicating, dropping or buffering a data/traffic packet respectively. As an example, the UPF may redirect the traffic to a web portal of the operator. As an example, the UPF may enforce the at least one usage reporting rule by measuring network resources usage in terms of traffic data volume, duration (i.e. time) and/or events, according to a measurement method in the usage reporting rule; the UPF may report the network resources usage to the SMF when the quota/threshold reached, and/or event and/or another trigger is (are) met. As an example, the UPF may enforce the at least one QoS enforcement rule by applying at least one of QoS parameters: 5QI, ARP, MBR, GBR to a service data flow; as an example, the UPF may enforce the at least one QoS enforcement rule by applying at least one of QoS parameters: Session AMBR and default 5QI/ARP combination to a PDU session.

As an example, the SMF and/or UPF may enforce the charging control rules by performing at least one of the following actions: receiving, by the SMF, a charging control rule from a PCF; determining, by the SMF, at least one of the user plane rules: at least one packet detection rule; at least one forwarding action rule; at least one QoS enforcement rule; or at least one usage reporting rule, sending, by the SMF to the UPF the at least one of the user plane rules; enforcing, by the UPF, the at least one of the user plane rules; reporting, by the UPF, usage report information to the SMF; or sending, by the SMF, the usage report information to the CHF.

As an example, the usage report information may comprise network resources usage in terms of traffic data volume, duration (i.e. time) applied to at least one of: a wireless device, a PDU session, a service data flow, an application, a network slice, or a data network.

The SMF may interact with the AMF, in an example, the SMF may send to the AMF a Namf_Communication_N1N2MessageTransfer message comprising one or more of: PDU Session ID, QoS Profile(s), CN Tunnel Info, and S-NSSAI from the Allowed NSSAI.

In an example, the AMF may interact with (R)AN and UE by sending to the (R)AN a N2 PDU Session Request message comprising the information received from the SMF, indicating the PDU session establishment is accepted.

In an example, the (R)AN may send to the AMF a N2 PDU Session Response message comprising one or more of: PDU Session ID, N2 SM information (PDU Session ID, AN Tunnel Info, List of accepted/rejected QFI(s)), wherein the AN Tunnel Info may be corresponding to the Access Network address of the N3 tunnel corresponding to the PDU Session.

In an example, the AMF may send to the SMF a Nsmf_PDUSession_UpdateSMContext Request message comprising the N2 SM information received from (R)AN to the SMF.

In an example, the SMF may initiate an N4 Session Modification procedure with the UPF. The SMF may provide AN Tunnel Info to the UPF as well as the corresponding forwarding rules. The UPF may send to the SMF a response message.

In an example, the SMF may request quota from CHF, e.g. "start of service data flow" event may need quota from CHF.

The SMF may send a message to the CHF (e.g. Charging Data Request [update]). As an example, for online charging or converged charging, the SMF may request quota from CHF when allocated quota is consumed or a trigger is met to request a quota.

Figure 14:
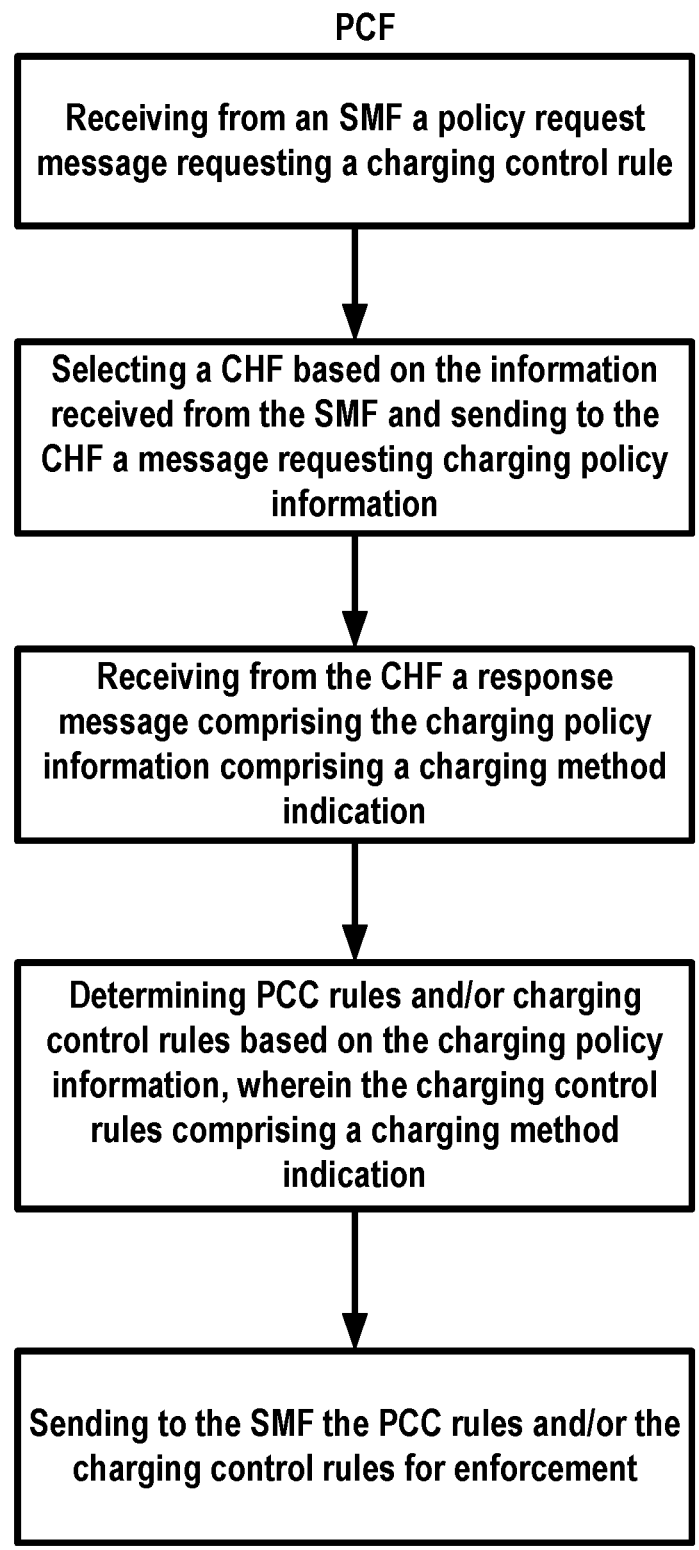
FIG. 14 is an example diagram depicting the procedures of PCF as per an aspect of an embodiment of the present disclosure.
Figure 15:
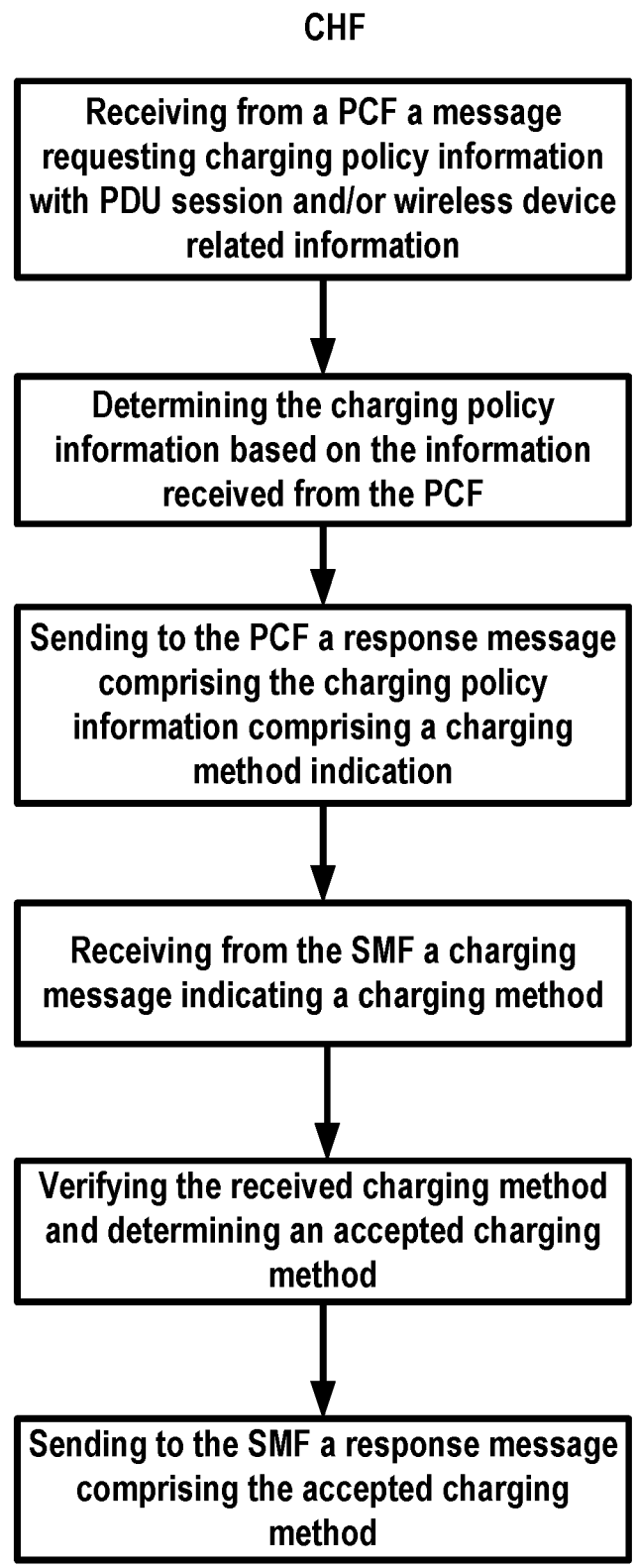
FIG. 15 is an example diagram depicting the procedures of CHF as per an aspect of an embodiment of the present disclosure.
Figure 16:
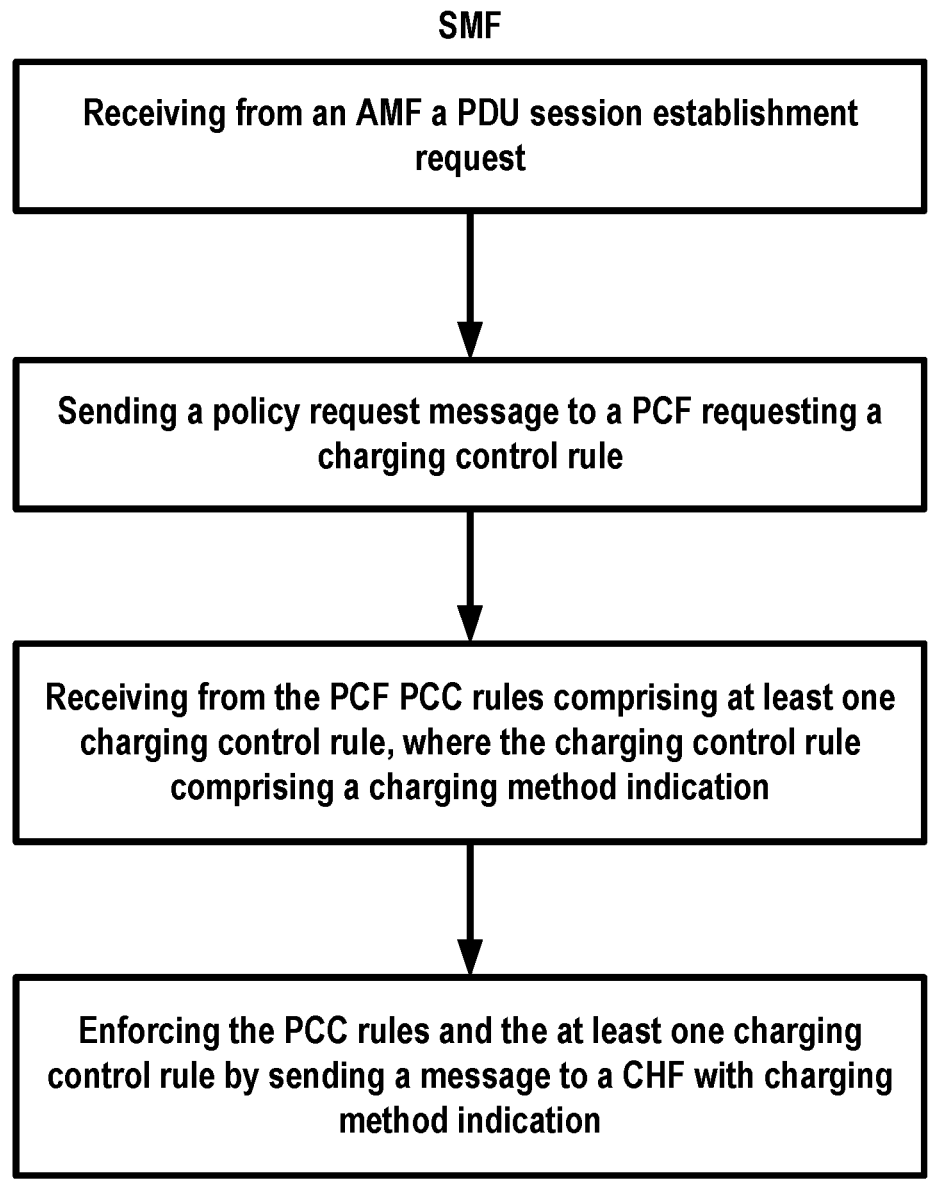
FIG. 16 is an example diagram depicting the procedures of SMF as per an aspect of an embodiment of the present disclosure.

As an example, the UPF may report resource usage of a PDU session to the SMF. As an example, the UPF may report resource usage of a wireless device to the SMF, by enforcing the charging control rules, the SMF may send to the CHF a message (e.g. Charging Data Request [update]) comprising resource usage information received from the UPF. In an example, the CHF may update CDR for this PDU session. The CHF may acknowledge the SMF by sending a Charging Data Response message. In an example, the SMF may send to the AMF a Nsmf_PDUSession_UpdateSMContext Response message. In an example, other interactions may be performed between SMF, AMF, (R)AN and UE for the PDU session establishment procedure. FIG. 14, FIG. 15 and FIG. 16 are example diagram depicting the procedures of PCF, CHF and SMF respectively as per an aspect of an embodiment of the present disclosure.

Figure 17:
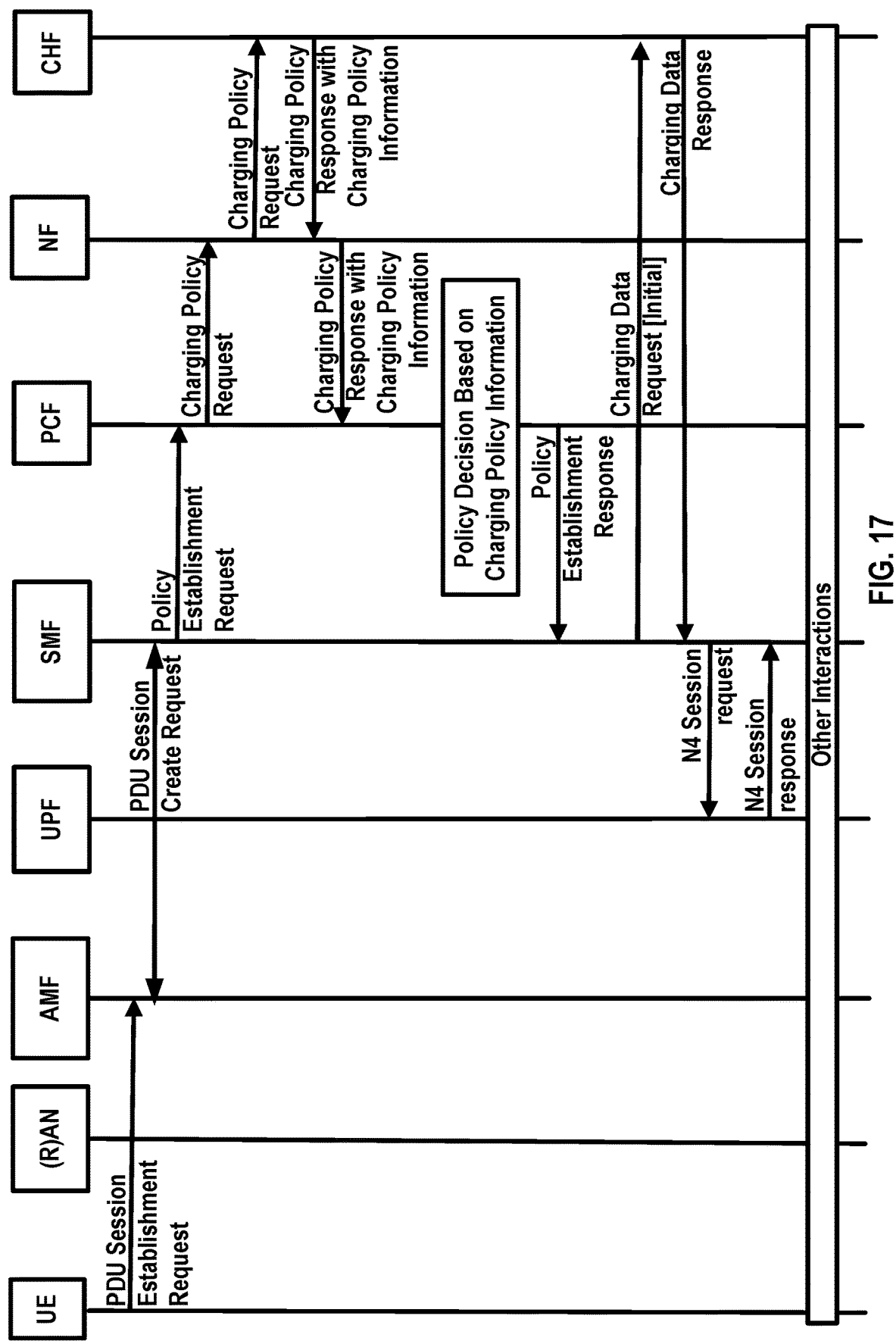
FIG. 17 is an example call flow of PCF makes policy decision based on charging policy information received from a NF as per an aspect of an embodiment of the present disclosure.

In an example, a UE may initiate a PDU session establishment procedure, during the procedure, a PCF may send a message to a network function (NF) requesting charging policy information. The NF may request charging policy information from a CHF and send the charging policy information to the PCF, the PCF may make policy decision based on the received charging policy information. FIG. 17 shows an example call flow which may comprise one or more of the following actions:

A UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. The PDU session establishment request message may comprise at least one of: a PDU session ID, Requested PDU Session Type, or a Requested SSC mode, etc.

In response to the message received from the UE, the AMF may select an SMF and send to the SMF a message (e.g. PDUSession_CreateSMContext Request) comprising at least one of: SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). As an example, the PCF identifier may be an identifier, or an IP address, or FQDN to identify the PCF. In response to the message received from the AMF, the SMF may send to the AMF a response message (e.g. PDUSession_CreateSMContext Response) comprising at least one of: Cause, SM Context ID or N1 SM container (PDU Session Reject (Cause)).

If dynamic PCC is deployed and a PCF ID is provided by the AMF, the SMF may performs PCF selection procedure by selecting a PCF (e.g. based on the PCF identifier received). The SMF may perform an SM Policy Association Establishment procedure to establish a PDU Session with the selected PCF and get the default PCC Rules for the PDU Session. The PDU session may be identified by the PDU Session ID. The message sent to the PCF by the SMF may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF).

In response to the message received from the SMF, the PCF may send a message (e.g. charging policy request) to an NF, and the message may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF).

As an example, the NF may be a network exposure function (NEF). As an example, the NF may be an operation administration and maintenance (OAM). As an example, the NF may be a charging function agent which connects to one or more CHFs. In response to the message received from the PCF, the NF (e.g. an NEF) may select a CHF based on the information received from the PCF, and/or the UE subscription information received from a UDR, and/or local configuration and operator policies, and/or other information for the PDU session. As an example, the NF may select a CHF based on one or more combination information received from the PCF. As an example, the NF may select a CHF based on the PLMN identifier. As an example, the NF may select a CHF based on the network slice information (e.g. S-NSSAI(s) and/or network slice instance identifier(s)). As an example, the NF may select a CHF based on the user location information. As an example, the NF may select a CHF based on the information of the SMF. As an example, the NF may select a CHF based on the Access Type and the RAT type.

The NF may send to the CHF a message (e.g. charging policy request) requesting one or more charging policy information. The message sent to the CHF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, the user location information, the information of the SMF for the PDU session (e.g. SMF identifier, IP address or FQDN of the SMF), or the PCF identifier.

In response to the message received from the NF, the CHF may determine/generate/create/derive charging policy information based on the information received from the NF. The charging policy information may comprise at least one of: an information element indicating a first charging method/charging type, wherein the first charging method/charging type may comprise at least one of: online charging, offline charging, or converged charging; an information element indicating at least one first charging rate; an information element indicating at least one first identifier or address of a CHF. The first charging method/charging type and/or first charging rate may be applied to at least one of: a PDU session identified by a PDU session identifier; a service data flow identified by at least one service data flow filter; an application identified by an application identifier; a wireless device identified by at least one user identity (e.g. SUPI, PEI, and/or GPSI); a data network identified by a DNN; or a network slice identified by a S-NSSAI and/or a network slice instance identifier.

As an example, the CHF may determine charging policy information based on the UE identity, e.g. the CHF may determine an online charging and/or a charging rate and/or an IP address (e.g. IPv4 address and/or IPv6 network prefix) of CHF for an SUPI. As an example, the CHF may determine charging policy information based on the type of PDU session, e.g. the CHF may determine an offline charging and/or a flat charging rate and/or an IPv4 address of CHF for an IPv4 type PDU session. As an example, the CHF may determine charging policy information based on the Access Type and/or the RAT Type, e.g. the CHF may determine an online charging and/or a charging rate and/or an IP address (e.g. IPv4 address and/or IPv6 network prefix) of CHF for an 3GPP access and/or 3GPP-NR-FDD RAT type. As an example, the CHF may determine charging policy information based on the PLMN identifier, e.g. the CHF may determine an offline charging and/or a flat charging rate and/or an FQDN of CHF for an PLMN identifier "12345". As an example, the CHF may determine charging policy information based on the application identifier, e.g. the CHF may determine an online charging and/or a charging rate and/or an identifier of CHF for an application identifier "skype". As an example, the CHF may determine charging policy information based on the DNN, e.g. the CHF may determine an offline charging and/or a flat charging rate and/or an IPv4 address of CHF for an DNN "IMS". As an example, the CHF may determine charging policy information based on the DNN, e.g. the CHF may determine an offline charging and/or a flat charging rate and/or an IPv4 address of CHF for an DNN "IMS". As an example, the CHF may determine charging policy information based on the network slice, e.g. the CHF may determine an online charging and/or a charging rate and/or an IPv6 network prefix of CHF for an S-NSSAI and/or network slice instance(s). As an example, the CHF may determine charging policy information based on the PDU session identifier, e.g. the CHF may determine an online charging and/or a charging rate and/or an IPv4 address of CHF for an PDU session identifier "PDU session 1". As an example, the CHF may determine charging policy information based on the user location information, e.g. the CHF may determine an offline charging and/or a charging rate and/or an IP address (e.g. IPv4 address and/or IPv6 network prefix) of CHF for a wireless device located within "registration area 1".

The CHF may send a response message (e.g. charging policy response) to the NF comprising the determined charging policy information. The message sent to the NF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID.

In response to the message received from the CHF, the NF may send to the PCF a response message (e.g. charging policy response) comprising the charging policy information received from the CHF. The message sent to the PCF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID.

In response to the message received from the NF, the PCF may make policy decision based on the received charging policy information, and may determine/generate/create/derive one or more PCC rules comprising one or more charging control rules, the one or more PCC rules and/or the one or more charging control rules may apply to at least one PDU session identified by a PDU session identifier, and/or at least one service data flow identified by at least one service data flow filter, and/or at least one application identified by an application identifier, and/or a wireless device identified by a UE identity, and/or a data network identified by a DNN, and/or a network slice identified by an S-NSSAI and/or a network slice instance identifier.

Each of the PCC rule determined by the PCF may comprise at least one of: at least one charging control rule; at least one policy control rule comprising at least one QoS control rule and/or at least one gating control rule; at least one usage monitoring control rule; at least one application detection and control rule; at least one traffic steering control rule; or at least one service data flow detection information (e.g. service data flow template). As an example, the charging control rule may be used for charging control and may comprise at least one of: an information element indicating a second charging method/charging type, wherein the second charging method/charging type may comprise at least one of: online charging, offline charging, or converged charging; an information element indicating at least one second charging rate; or an information element indicating at least one second identifier or address of a CHF.

As an example, the policy control rule may be used for policy control, wherein the at least one QoS control rule may be used for QoS control and the at least one gating control rule may be used for gating control. As an example, the QoS control rule may be used to authorize QoS on a service data flow. As an example, the gating control rule may be used to discard packets that don't match any service data flow of the gating control rule and/or associated PCC rules.

As an example, the usage monitoring control rule may be used to monitor, both volume and time usage, and report the accumulated usage of network resources. As an example, the application detection and control rule may comprise a request to detect a specified application traffic, report to a PCF on a start or stop of application traffic and to apply a specified enforcement and charging actions. As an example, the traffic steering control rule may be used to activate/deactivate traffic steering policies for steering a subscriber's traffic to appropriate operator or 3rd party service functions (e.g. NAT, antimalware, parental control, DDoS protection) in an (S)Gi-LAN. As an example, the service data flow detection information (e.g. service data flow template) may comprise a list of service data flow filters or an application identifier that references the corresponding application detection filter for the detection of the service data flow. As an example, the service data flow detection information (e.g. service data flow template) may comprise combination of traffic patterns of the Ethernet PDU traffic.

As an example, the PCF may determine charging control rules based on charging policy information and/or other information (e.g. local configuration and operator policies, or subscription information). As an example, the PCF may determine the second charging method/charging type in the charging control rule based on the first charging method/charging type in the charging policy information. The second charging method/charging type may be the same as the first charging method/charging type or may be different. As an example, the PCF may determine an online charging method in the charging control rule based on the online charging method in the charging policy information. As an example, the PCF may determine a converged charging method in the charging control rule based on the converged charging method in the charging policy information. As an example, the PCF may determine an offline charging method in the charging control rule based on a converged charging method in the charging policy information. As an example, the PCF may determine an online charging method in the charging control rule based on an offline charging method in the charging policy information and the online charging method in a local configuration and operator policies.

As an example, the PCF may determine the second charging rate in the charging control rule based on the first charging rate in the charging policy information. The second charging rate may be the same as the first charging rate or may be different. As an example, the PCF may determine a charging rate 1 in the charging control rule based on the charging rate 1 in the charging policy information. As an example, the PCF may determine a charging rate 1 in the charging control rule based on a charging rate 2 in the charging policy information and a charging rate 1 in the subscription information (e.g. from a UDR).

As an example, the PCF may determine the second identifier or address of a CHF in the charging control rule based on the first identifier or address of a CHF in the charging policy information. The second identifier or address of the CHF may be the same as the first identifier or address of a CHF or may be different. As an example, the PCF may determine an IPv4 address of a CHF in the charging control rule based on the IPv4 address of the CHF in the charging policy information. As an example, the PCF may determine an IPv6 network prefix address of a CHF in the charging control rule based on the an IPv4 address and the IPv6 network prefix address of the CHF in the charging policy information. As an example, the PCF may determine an identifier of a CHF in the charging control rule based on an FQDN of the CHF in the charging policy information.

As an example, the PCF may connect with one or more CHFs. The PCF may request to the one or more CHFs and receive charging policy information from the one or more CHFs respectively. The PCF may determine each charging control rule based on each charging policy information respectively. As an example, the PCF may determine charging control rule 1 based on charging policy information 1 received from CHF 1, and determine charging control rule 2 based on charging policy information 2 received from CHF 2. As an example, the PCF may determine charging control rule 3 and charging control rule 4 based on charging policy information 3 received from CHF 3, and determine charging control rule 5 and charging control rule 6 based on charging policy information 4 received from CHF 4.

The PCF may send to the SMF a response message (e.g. SM Policy Association Establishment Response) comprising one or more PCC rules comprising one or more charging control rules. As an example, the response message may comprise one or more PCC rules associate with one CHF (e.g. one or more PCC rules comprising one or more charging control rules may be derived from charging policy information received from CHF 1). As an example, the response message may comprise one or more PCC rules associate with more than one CHFs (e.g. PCC rule 1 comprises one or more charging control rules 1, and PCC rule 2 comprises one or more charging control rules 2, where PCC rule 1 and/or charging control rules 1 may be derived from charging policy information received from CHF 1, and PCC rule 2 and/or charging control rules 2 may be derived from charging policy information received from CHF 2. As an example, charging control rules 1 may comprise the address of CHF 1, charging control rules 2 may comprise the address of CHF 2). The response message may comprise at least one of the following information elements which the one or more PCC rules applied to: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID.

In response to the message received from the PCF, the SMF may install the one or more PCC rules and other information received. The SMF may select one of CHF and enforce charging control rules associated with the CHF by comprising at least one of the following actions: based on the charging control rules and other information elements, the SMF may construct a message (e.g. charging data request [initial]) and send the constructed message to the CHF to establish a charging session. The identifier or address of the CHF in the charging control rule may be used by the SMF to establish a charging session. The message sent to the CHF may comprise at least one of the following: an information element indicating a requested charging method/charging type, wherein the charging method/charging type may comprise at least one of: online charging, offline charging, or converged charging; an information element indicating at least one requested charging rate; an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the SMF may indicate to the CHF an online charging method; as an example, the SMF may indicated to the CHF an offline charging method; as an example, the SMF may indicate to the CHF a converged charging method. In response to the message received from the SMF, the CHF may verify the information received and determine whether to accept the charging session establishment request. As an example, the CHF may accept the request, and may send to the SMF a response message (e.g. charging data response). The response message may comprise at least one of the following: an information element indicating a success cause value to indicate the request is accepted; an information element indicating an accepted charging method/charging type, wherein the accepted charging method/charging type may comprise at least one of: online charging, offline charging, or converged charging; as an example, the accepted charging method/charging type may be the same as the requested charging method/charging type; an information element indicating at least one charging rate (e.g. rating group); an information element indicating at least one granted unit (e.g. granted volume and/or granted time for online charging or converged charging); an information element indicating final unit action (e.g. redirect the traffic to a web portal when the final granted unit has been consumed by the wireless device); an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the CHF may reject the request, and may send to the SMF a response message (e.g. charging data response) comprising a proposed charging method/charging type. The response message may comprise at least one of the following: an information element indicating a reject cause value to indicate the request is rejected; or an information element indicating an accepted charging method/charging type, wherein the accepted charging method/charging type proposed by the CHF may comprise at least one of: online charging, offline charging, or converged charging; as an example, the accepted charging method/charging type may be different from the requested charging method/charging type. As an example, the requested charging method may be offline charging, and the proposed accepted charging method may be converged charging.

In response to the message received from the CHF, the SMF may take different actions based on the result of the response. As an example, when receiving a reject response message from the CHF, the SMF may resend to the CHF a second request message (e.g. charging data request) comprising the accepted charging method/charging type proposed by the CHF. As an example, the requested charging method in the second request message may be set as the proposed accepted charging method in the response message (e.g. converged charging). The CHF may accept the second request by sending to the CHF a second response message (e.g. charging data response) comprising a success cause value indicating the request is accepted. As an example, when receiving a reject response message from the CHF, the SMF may select a second CHF from the information (e.g. charging policy rules) received from the PCF and send a request message (e.g. charging data request) to the second CHF to establish a charging session. As an example, after receiving a success response message from the CHF, the SMF may enforce the PCC rules and/or charging control rules required by the PCF and/or charging function required by the CHF by determining/generating/creating/deriving at least one of the following user plane rules based on the received PCC rules and/or charging control rules from the PCF and/or the information (e.g. charging policy information) received from the CHF: at least one packet detection rule; at least one forwarding action rule; at least one QoS enforcement rule; or at least one usage reporting rule.

As an example, the packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. As an example, the forwarding action rule may comprise an apply action parameter, which may indicate whether a UP function may forward, duplicate, drop or buffer the data/traffic packet respectively. As an example, the usage reporting rule may be used to measure the network resources usage in terms of traffic data volume, duration (i.e. time) and/or events, according to a measurement method in the usage reporting rule. As an example, the QoS enforcement rule contains instructions to request the UP function to perform QoS enforcement of the user plane traffic. As an example, the SMF may determine a packet detection rule based on the service data flow detection information (e.g. service data flow template) received from the PCF. As an example, the SMF may determine a forwarding action rule based on the policy control rule and/or usage monitoring control rule received from the PCF and/or the final unit action received from the CHF. As an example, the SMF may determine a QoS enforcement rule based on the policy control rule (e.g. QoS control rule) received from the PCF. As an example, the SMF may determine a usage reporting rule based on the usage monitoring control rule received from the PCF and/or the at least one granted unit (e.g. granted volume and/or granted time for online charging or converged charging) received from the CHF.

As an example, the SMF may enforce the PCC rules and/or charging control rules required by the PCF and/or charging function required by the CHF by selecting a UPF and sending to the UPF a message (e.g. N4 session establishment/modification request) comprising the at least one of the following user plane rules: at least one packet detection rule; at least one forwarding action rule; at least one QoS enforcement rule; or at least one usage reporting rule. In response to the message received from the SMF, the UPF may install the user plane rules, send to the SMF a response message (e.g. N4 session establishment/modification response), and enforce the user plane rules received from the SMF. As an example, the UPF may enforce the at least one packet detection rule by matching a user data/traffic packet with service data flow template (e.g. service data flow filters and/or application identifiers), and may apply other user plane rules (e.g. forwarding action rule, QoS enforcement rule, and usage reporting rule) to the data/traffic packets matched the packet detection rule. As an example, the UPF may enforce the at least one forwarding action rule by forwarding, duplicating, dropping or buffering a data/traffic packet respectively. As an example, the UPF may redirect the traffic to a web portal of the operator. As an example, the UPF may enforce the at least one usage reporting rule by measuring network resources usage in terms of traffic data volume, duration (i.e. time) and/or events, according to a measurement method in the usage reporting rule; the UPF may report the network resources usage to the SMF when the quota/threshold reached, and/or event and/or another trigger is (are) met. As an example, the UPF may enforce the at least one QoS enforcement rule by applying at least one of QoS parameters: 5QI, ARP, MBR, GBR to a service data flow; as an example, the UPF may enforce the at least one QoS enforcement rule by applying at least one of QoS parameters: Session AMBR and default 5QI/ARP combination to a PDU session.

As an example, the SMF and/or UPF may enforce the charging control rules by performing at least one of the following actions: receiving, by the SMF, a charging control rule from a PCF; determining, by the SMF, at least one of the user plane rules: at least one packet detection rule; at least one forwarding action rule; at least one QoS enforcement rule; or at least one usage reporting rule, sending, by the SMF to the UPF the at least one of the user plane rules; enforcing, by the UPF, the at least one of the user plane rules; reporting, by the UPF, usage report information to the SMF; sending, by the SMF, the usage report information to the CHF. As an example, the usage report information may comprise network resources usage in terms of traffic data volume, duration (i.e. time) applied to at least one of: a wireless device, a PDU session, a service data flow, an application, a network slice, or a data network.

In an example, other interactions may be performed by CHF, SMF, AMF, (R)AN and UE for the PDU session establishment procedure.

Figure 18:
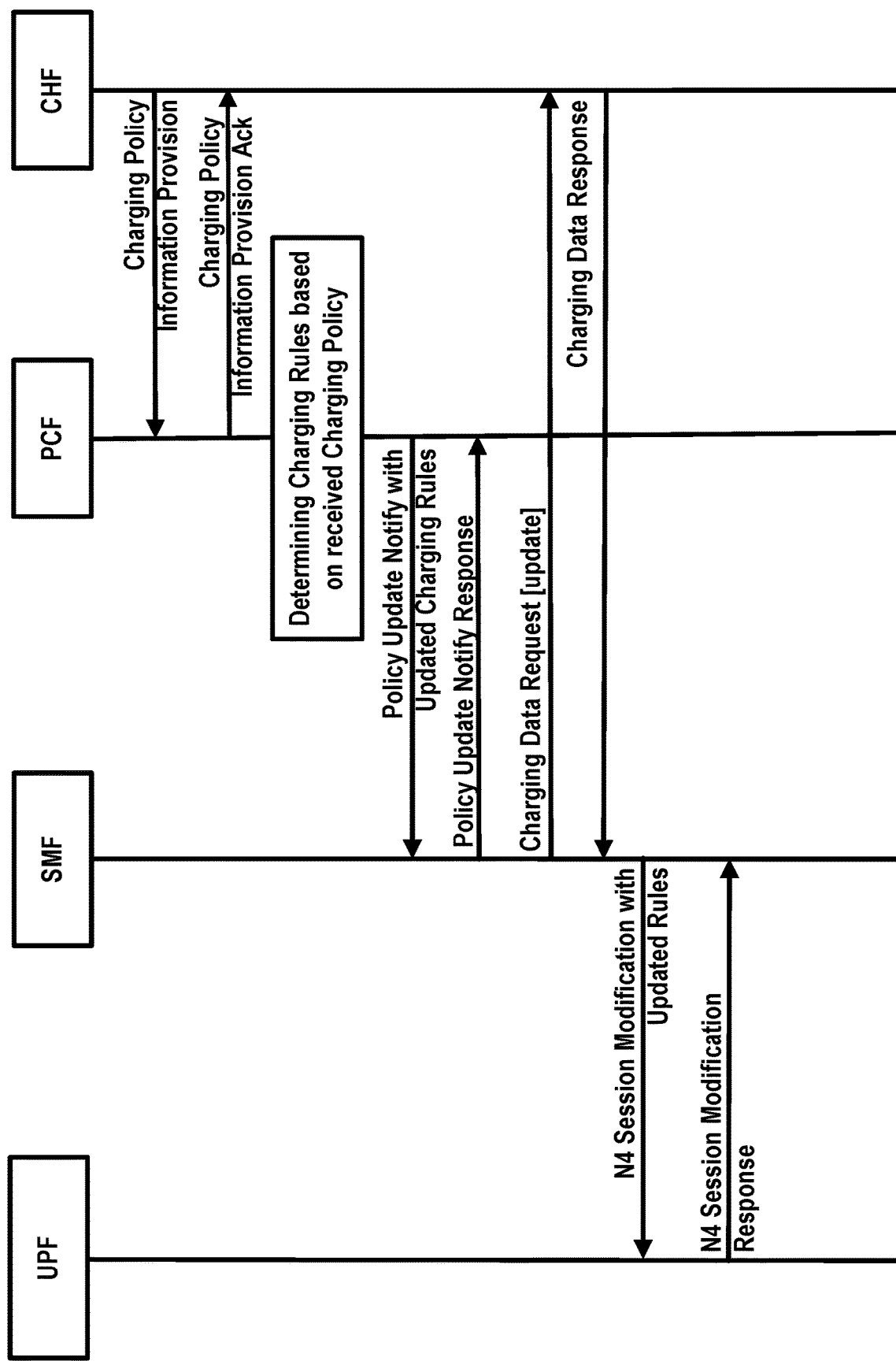
FIG. 18 is an example call flow of CHF updates charging policy information as per an aspect of an embodiment of the present disclosure.

In an example, a CHF may update charging policy information to a PCF by initiating charging policy information provision procedure during a PDU session, the PCF may make policy decision based on the received charging policy information and send to an SMF one or more updated PCC rules and/or changing control rules. FIG. 18 shows an example call flow which may comprise one or more actions.

During a PDU session, a CHF may receive a trigger to update charging policy information. As an example, the CHF may receive a trigger (e.g. a message) from a billing domain (BD), e.g. the credit of a wireless device has been updated. As an example, the CHF may receive a trigger from an OAM. As an example, the CHF may receive an internal trigger (e.g. a timer) based on local configuration and operator policies.

In response to the trigger received, the CHF may determine and update charging policy information based on the trigger. The charging policy information may comprise at least one of: an information element indicating a first charging method/charging type, wherein the first charging method/charging type may comprise at least one of: online charging, offline charging, or converged charging; an information element indicating at least one first charging rate; or an information element indicating at least one first identifier or address of a CHF. The first charging method/charging type and/or first charging rate may be applied to at least one of: a PDU session identified by a PDU session identifier; a service data flow identified by at least one service data flow filter; an application identified by an application identifier; a wireless device identified by at least one user identity (e.g. SUPI, PEI, and/or GPSI); a data network identified by a DNN; a network slice identified by a S-NSSAI and/or a network slice instance identifier.

As an example, the CHF may update the first charging method/charging type and/or the at least one first charging rate and/or the at least one first identifier or address of a CHF. As an example, the CHF may change the first charging method/charging type from converged charging to online charging. As an example, the CHF may change the at least one first charging rate from one value to a new value. As an example, the CHF may change the address of the CHF. As an example, the applied scope of the charging policy information may be updated. As an example, the existing charging policy information may be applied to a service data flow, however, the updated charging policy information may be applied to a PDU session.

The CHF may send a message (e.g. charging policy information provision) to the PCF comprising the updated charging policy information, where the PCF may have already established a charging control session with the CHF. The message sent to the PCF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID.

In response to the message received from the CHF, the PCF may send to the CHF a response message (e.g. charging policy information provision ack). The PCF may make policy decision based on the received updated charging policy information and may determine/update one or more PCC rules comprising one or more charging control rules. As an example, the PCF may determine keeping the existing PCC rules and/or charging control rules unchanged. As an example, the PCF may update at least one of the following rules in a PCC rule: at least one charging control rule; at least one policy control rule comprising at least one QoS control rule and/or at least one gating control rule; at least one usage monitoring control rule; at least one application detection and control rule; at least one traffic steering control rule; or at least one service data flow detection information (e.g. service data flow template).

As an example, the PCF may update at least one of the following information elements in a charging control rule: an information element indicating a second charging method/charging type, wherein the second charging method/ charging type may comprise at least one of: online charging, offline charging, or converged charging; an information element indicating at least one second charging rate; or an information element indicating at least one second identifier or address of a CHF.

The PCF may send to the SMF a message (e.g. Policy Update Notify) comprising one or more updated PCC rules comprising one or more updated charging control rules. In response to the message received from the PCF, the SMF may send to the PCF a response message (Policy Update Notify Response). The SMF may install the one or more PCC rules and/or changing control rules and other information received. The SMF may enforce charging control rules by comprising at least one of the following actions: based on the charging control rules and other information elements, the SMF may construct a message (e.g. charging data request [update]) and send the constructed message to the CHF to modify the charging session. The message sent to the CHF may comprise at least one of the following updated information elements: an information element indicating an updated charging method/charging type, wherein the charging method/charging type may comprise at least one of: online charging, offline charging, or converged charging; an information element indicating at least one updated charging rate; an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; an information element indicating a network slice identified by a S-NSSAI and/or a network slice instance identifier.

As an example, the SMF may indicate to the CHF an online charging method; as an example, the SMF may indicated to the CHF an offline charging method; as an example, the SMF may indicate to the CHF a converged charging method. In response to the message received from the SMF, the CHF may verify the information received and determine whether to accept the charging session establishment request. As an example, the CHF may accept the request, and may send to the SMF a response message (e.g. charging data response). The response message may comprise at least one of the following: an information element indicating a success cause value to indicate the session updating is success; an information element indicating an accepted charging method/charging type, wherein the accepted charging method/charging type may comprise at least one of: online charging, offline charging, or converged charging; as an example, the accepted charging method/charging type may be the same as the updated charging method/charging type; an information element indicating at least one charging rate (e.g. rating group); an information element indicating at least one granted unit (e.g. granted volume and/or granted time for online charging or converged charging); an information element indicating final unit action (e.g. redirect the traffic to a web portal when the final granted unit has been consumed by the wireless device); an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; an information element indicating a network slice identified by a S-NSSAI and/or a network slice instance identifier; or an information element indicating a usage report.

As an example, the usage report information element may be used by the SMF to report current resource usage (e.g. volume, and/or time usage for the current PDU session) before the charging rate is changed. As an example, the CHF may reject the request, and may send to the SMF a response message (e.g. charging data response) comprising a proposed charging method/charging type. The response message may comprise at least one of the following: an information element indicating a reject cause value to indicate the request is rejected; an information element indicating an accepted charging method/charging type, wherein the accepted charging method/charging type proposed by the CHF may comprise at least one of: online charging, offline charging, or converged charging; as an example, the accepted charging method/charging type may be different from the requested charging method/charging type. As an example, the requested charging method may be offline charging, and the proposed accepted charging method may be converged charging.

In response to the message received from the CHF, the SMF may take different actions based on the result of the response.

As an example, when receiving a reject response message from the CHF, the SMF may resend to the CHF a second request message (e.g. charging data request) comprising the accepted charging method/charging type proposed by the CHF. As an example, the requested charging method in the second request message may be set as the proposed accepted charging method in the response message (e.g. converged charging). The CHF may accept the second request by sending to the CHF a second response message (e.g. charging data response) comprising a success cause value indicating the request is accepted.

As an example, when receiving a reject response message from the CHF, the SMF may select a second CHF from the information (e.g. charging policy rules) received from the PCF and send a request message (e.g. charging data request) to the second CHF to establish a charging session. As an example, after receiving a success response message from the CHF, the SMF may enforce the updated PCC rules and/or updated charging control rules required by the PCF and/or charging function required by the CHF by determining/updating at least one of the following user plane rules based on the received updated PCC rules and/or updated charging control rules from the PCF and/or the information (e.g. charging policy information) received from the CHF: at least one packet detection rule; at least one forwarding action rule; at least one QoS enforcement rule; or at least one usage reporting rule.

As an example, the SMF may enforce the updated PCC rules and/or updated charging control rules required by the PCF and/or charging function required by the CHF by sending to the UPF a message (e.g. N4 session modification request) comprising the at least one of the following updated user plane rules: at least one packet detection rule; at least one forwarding action rule; at least one QoS enforcement rule; or at least one usage reporting rule. As an example, the SMF may not send a message to the UPF to update the rules and keep the existing rules in the UPF unchanged. In response to the message received from the SMF, the UPF may install the user plane rules, send to the SMF a response message (e.g. N4 session modification response). As an example, the UPF may enforce the updated user plane rules received from the SMF.

In an example, a policy control function may receive from a session management function, a first message requesting a charging control rule for a packet data unit session of a wireless device. In an example, the policy control function may send to a charging function and in response to the first message, a second message requesting a charging policy information for the packet data unit session. In an example, the policy control function may receive from the charging function a third message comprising at least one charging policy information. In an example, the policy control function may determine at least one charging control rule for the packet data unit session based on the at least one charging policy information. In an example, the policy control function may send to the session management function, a fourth message comprising the at least one charging control rule. In an example, the session management function may enforce the at least one charging control rule. In an example, the at least one charging policy information may comprises at least one of: an information element indicating a charging method applicable for the at least one packet data unit session; an information element indicating a charging rate applicable for the at least one packet data unit session; or an information element indicating an address of the charging function. In an example, the charging method may comprise at least one of: an information element indicating that an online charging is applicable for the packet data unit session; an information element indicating that an offline charging is applicable for the packet data unit session; or an information element indicating that a converged charging is applicable for the packet data unit session. In an example, the session management function may send to a user plane function, a fifth message requesting to establish or modify a N4 session, the fifth message may comprise the at least one charging control rule for the packet data unit session and the wireless device; In an example, the session management function may receive from the user plane function, a sixth message in response to the fifth message.

In an example, the session management function may send to the charging function, a seventh message requesting to establish a charging session, the seventh message may comprise a charging method indication. In an example, the session management function may receive from the charging function, an eighth message in response to the seventh message. In an example, the charging method indication may comprise at least one of: an information element indicating an online charging; an information element indicating an offline charging; or an information element indicating a converged charging. In an example, the first message may comprise at least one of: an identifier of the wireless device; or an identifier of the packet data unit session. In an example, the at least one charging control rule may comprise at least one of: a charging policy; a quality of service policy; or a gating policy. In an example, a charging function may receive from a policy control function, a first message requesting at least one charging policy for a packet data unit session and a wireless device. In an example, the charging function may determine the at least one charging policy for the packet data unit session and the wireless device.

In an example, the charging function may send to the policy control function, a second message in response to the first message, the second message may comprise the at least one charging policy for the packet data unit session and the wireless device; wherein the charging policy may comprise an information element indicating a charging rate. In an example, the charging function may receive from a session management function, a third message requesting to establish a charging session, wherein the third message comprising at least one of: an information element indicating a charging rate; or an information element indicating a charging type. In an example, the charging function may send to the session management function, a fourth message in response to the third message. In an example, the charging type indication may comprise at least one of: an information element indicating an online charging; an information element indicating an offline charging; or an information element indicating a converged charging.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

Figure 20:
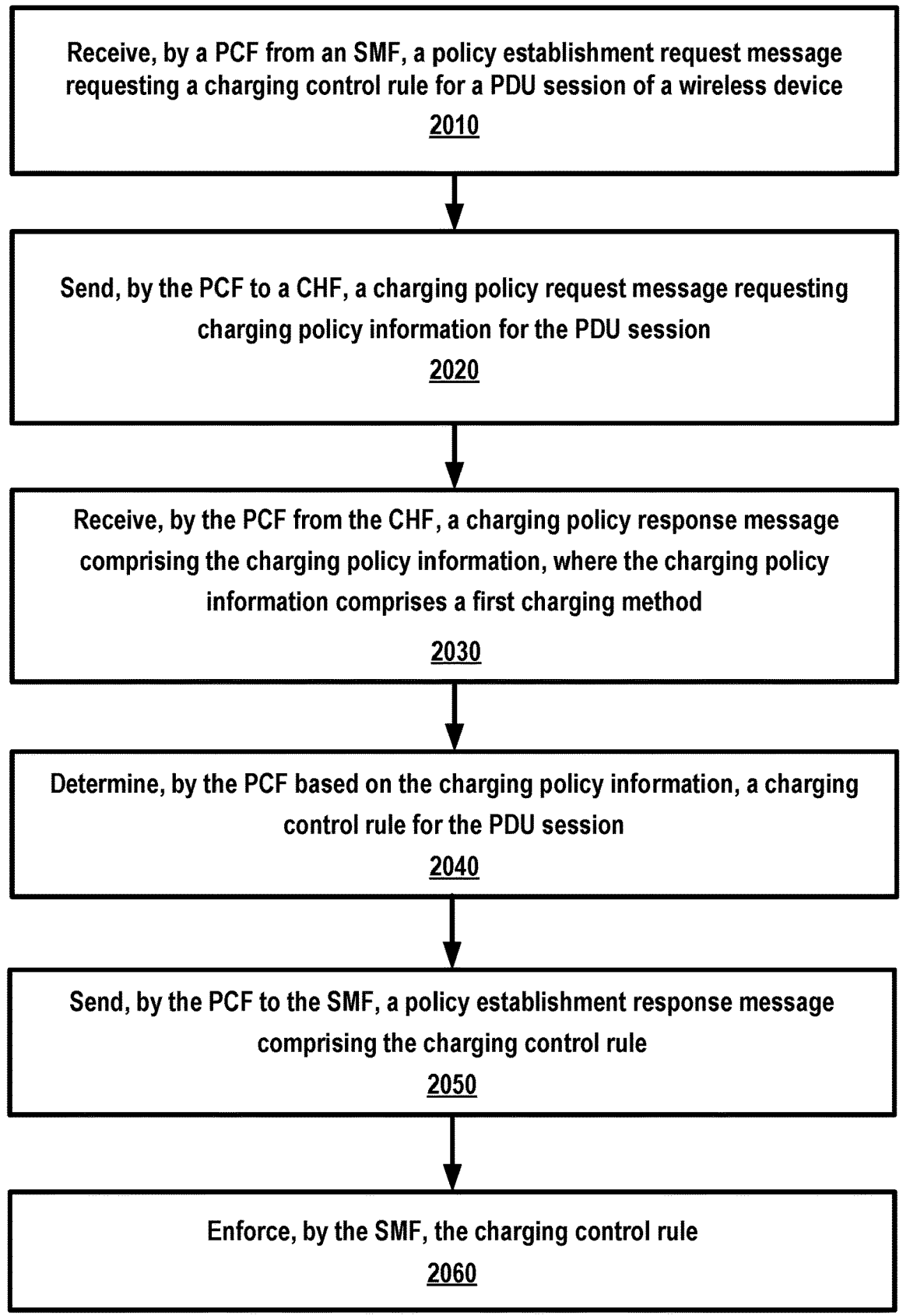
FIG. 20 is a flow diagram as per an aspect of an example embodiment of the present disclosure.

FIG. 20 is a flow diagram of an aspect of an embodiment of the present disclosure. At 2010, a policy control function (PCF) may receive from a session management function (SMF), a policy establishment request message requesting a charging control rule for a packet data unit (PDU) session of a wireless device. At 2020, in response to the policy establishment request message, the PCF may send to a charging function (CHF), a charging policy request message requesting charging policy information for the PDU session. At 2030, the PCF may receive from the CHF, a charging policy response message comprising the charging policy information. The charging policy information comprises a first charging method. At 2040, the PCF may determine a charging control rule for the PDU session based on the charging policy information. At 2050, the PCF may send to the SMF, a policy establishment response message. The policy establishment response message may comprise the charging control rule. At 2060, the SMF may enforce the charging control rule.

According to an example embodiment, the charging policy request message may comprise an identifier of the wireless device. According to an example embodiment, the charging policy request message may comprise a UE IP address. According to an example embodiment, the charging policy request message may comprise an identifier of the PDU session. According to an example embodiment, the PCF may send to the CHF, the charging policy request message via a network function. According to an example embodiment, the CHF may determine the charging policy information for the PDU session based on an identifier of the wireless device. According to an example embodiment, the CHF may determine the charging policy information for the PDU session based on a type of PDU session. According to an example embodiment, the CHF may determine the charging policy information for the PDU session based on an access type. According to an example embodiment, the CHF may determine the charging policy information for the PDU session based on a radio access technology (RAT) type. According to an example embodiment, the CHF may determine the charging policy information for the PDU session based on a public land mobile network (PLMN) identifier. According to an example embodiment, the CHF may determine the charging policy information for the PDU session based on an application identifier. According to an example embodiment, the CHF may determine the charging policy information for the PDU session based on a data network name (DNN). According to an example embodiment, the CHF may determine the charging policy information for the PDU session based on a single network slice selection assistance information (S-NSSAI). According to an example embodiment, the CHF may determine the charging policy information for the PDU session based on a session identifier of the PDU session. According to an example embodiment, the CHF may determine the charging policy information for the PDU session based on user location information.

According to an example embodiment, the charging policy information may comprise an information element indicating a first charging rate is applicable for the PDU session. According to an example embodiment, the charging policy information may comprise an address of a first charging function. According to an example embodiment, based on the charging policy information, the SMF may determine a policy and charging control (PCC) rule for the PDU session. According to an example embodiment, the PCC rule may comprise a charging control rule. According to an example embodiment, the PCC rule may comprise a policy control rule. According to an example embodiment, the policy control rule may comprise a QoS control rule. According to an example embodiment, the policy control rule may comprise a gating control rule. According to an example embodiment, the PCC rule may comprise a usage monitoring control rule. According to an example embodiment, the PCC rule may comprise an application detection and control rule. According to an example embodiment, the PCC rule may comprise a traffic steering control rule. According to an example embodiment, the PCC rule may comprise a service data flow detection information.

According to an example embodiment, the charging control rule may comprise an information element indicating a second charging method. According to an example embodiment, the charging control rule may comprise an information element indicating a second charging rate. According to an example embodiment, the charging control rule may comprise an information element indicating an identifier or address of a second CHF. According to an example embodiment, the second charging method may comprise an information element indicating that an online charging is applicable for the PDU session. According to an example embodiment, the second charging method may comprise an information element indicating that an offline charging is applicable for the PDU session. According to an example embodiment, the second charging method may comprise an information element indicating that a converged charging is applicable for the PDU session.

According to an example embodiment, the enforcing the charging control rule by the SMF may comprise sending, by the SMF to the CHF, a charging data request message requesting to establish a charging session, and the charging data request message may comprise a requested charging method indication. According to an example embodiment, the enforcing the charging control rule by the SMF may comprise receiving, by the SMF from the CHF, a charging data response message comprising an accepted charging method indication. According to an example embodiment, the requested charging method indication may comprise an information element indicating an online charging. According to an example embodiment, the requested charging method indication may comprise an information element indicating an offline charging. According to an example embodiment, the requested charging method indication may comprise an information element indicating a converged charging. According to an example embodiment, the accepted charging method indication may comprise an information element indicating an online charging. According to an example embodiment, the accepted charging method indication may comprise an information element indicating an offline charging. According to an example embodiment, the accepted charging method indication may comprise an information element indicating a converged charging.

According to an example embodiment, the SMF may determine a user plane rule for the PDU session based on the charging control rule. According to an example embodiment, the SMF may determine a user plane rule for the PDU session based on charging policy information received from the CHF. According to an example embodiment, the SMF may send to a user plane function (UPF), a N4 request message requesting to establish or modify a session. The N4 request message may comprise the user plane rule for the PDU session and the wireless device. According to an example embodiment, the UPF may enforce the user plane rule. According to an example embodiment, the N4 request message may comprise an N4 session identifier for the PDU session. According to an example embodiment, the session is an N4 session. According to an example embodiment, the user plane rule may comprise a packet detection rule. According to an example embodiment, the user plane rule may comprise forwarding action rule. According to an example embodiment, the user plane rule may comprise a QoS enforcement rule. According to an example embodiment, the user plane rule may comprise a usage reporting rule. According to an example embodiment, the enforcing the user plane rule by the UPF may comprise sending, by the UPF to the SMF, a resource usage report for the PDU session. According to an example embodiment, the enforcing the user plane rule by the UPF may comprise receiving, by the UPF from the SMF, a response message to the resource usage report.

According to an example embodiment, an NRF may receive from the PCF, a CHF selection request message comprising PDU session information. According to an example embodiment, the NRF may determine an address of a CHF based on the PDU session information. According to an example embodiment, the NRF may send to the PCF, the address of the CHF.

According to an example embodiment, the PDU session information may comprise a UE IP address. According to an example embodiment, the PDU session information may comprise a type of PDU Session. According to an example embodiment, the PDU session information may comprise an access type. According to an example embodiment, the PDU session information may comprise a radio access technology (RAT) type. According to an example embodiment, the PDU session information may comprise user location information. According to an example embodiment, the PDU session information may comprise information of the SMF for the PDU session.

Figure 21:
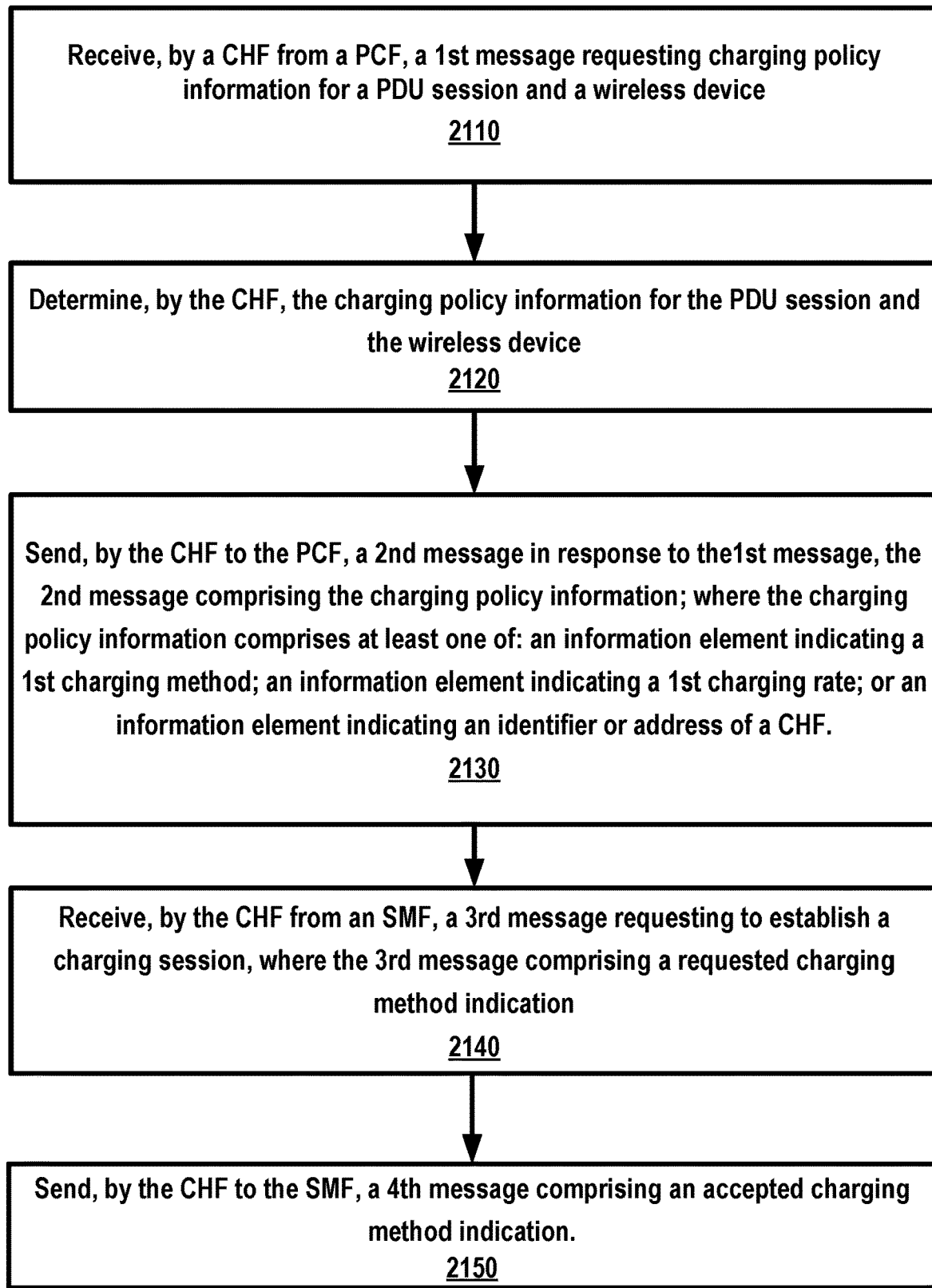
FIG. 21 is a flow diagram as per an aspect of an example embodiment of the present disclosure.

FIG. 21 is a flow diagram of an aspect of an embodiment of the present disclosure. At 2110, a charging function (CHF) may receive from a policy control function (PCF), a first message requesting charging policy information for a packet data unit (PDU) session and a wireless device. At 2120, the CHF may determine the charging policy information for the PDU session and the wireless device. At 2130, the CHF may send to the PCF, a second message in response to the first message, the second message may comprise the charging policy information. According to an example embodiment, the charging policy information may comprise an information element indicating a first charging method. According to an example embodiment, the charging policy information may comprise an information element indicating a first charging rate. According to an example embodiment, the charging policy information may comprise an information element indicating an identifier or address of a CHF. At 2140, the CHF may receive from the SMF, a third message requesting to establish a charging session. The third message may comprise a requested charging method indication. At 2150, the CHF may send to the SMF, a fourth message comprising an accepted charging method indication.

According to an example embodiment, the requested charging method indication may comprise an information element indicating an online charging. According to an example embodiment, the requested charging method indication may comprise an information element indicating an offline charging. According to an example embodiment, the requested charging method indication may comprise an information element indicating a converged charging. According to an example embodiment, the accepted charging method indication may comprise an information element indicating an online charging. According to an example embodiment, the accepted charging method indication may comprise an information element indicating an offline charging. According to an example embodiment, the accepted charging method indication may comprise an information element indicating a converged charging.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {can, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a charging function (CHF) from a policy control function (PCF), a first request for charging policy information for a packet data unit (PDU) session of a wireless device;
   determining, by the CHF, the charging policy information for the PDU session of the wireless device, wherein the charging policy information indicates a charging method comprising one or more of:
   online charging;
   offline charging; and
   converged charging;
   sending, by the CHF to the PCF, a message comprising the charging policy information;
   receiving, by the CHF from a session management function (SMF), a second request to establish a charging session, wherein the second request comprises the charging method; and
   sending, by the CHF to the SMF, a confirmation for the charging method.

2. The method of claim 1, wherein the first request comprises at least one of:
   an identifier of the wireless device;
   a UE IP address; or
   an identifier of the PDU session.

3. The method of claim 1, further comprising receiving, by the CHF from the PCF, the first request via a network function.

4. The method of claim 1, wherein the determining is based on at least one of:
- an identifier of the wireless device;
- a type of PDU session;
- an access type;
- a radio access technology (RAT) type;
- a public land mobile network (PLMN) identifier;
- an application identifier;
- a data network name (DNN);
- a single network slice selection assistance information (S-NSSAI);
- the identifier of the PDU session; or
- user location information.

5. The method of claim 1, wherein the charging policy information further comprises a charging rate applied to the PDU session.

6. The method of claim 5, wherein the second request comprises the charging rate.

7. The method of claim 1, wherein the charging policy information further comprises an address of the CHF applied to the PDU session.

8. The method of claim 7, wherein the second request comprises the address of the CHF.

9. The method of claim 1, wherein the second request further comprises a requested charging method indication, wherein the requested charging method indication comprises at least one of:
- an information element indicating a requested online charging;
- an information element indicating a requested offline charging; or
- an information element indicating a requested converged charging.

10. The method of claim 1, further comprising sending, by CHF to the SMF, a charging data response message comprising an accepted charging method indication, wherein the accepted charging method indication comprises at least one of:
- an information element indicating an accepted online charging;
- an information element indicating an accepted offline charging; or
- an information element indicating an accepted converged charging.

11. An apparatus comprising:
- one or more processors; and
- memory storing instructions that, when executed by the one or more processors, cause a charging function (CHF) to:
  - receive, from a policy control function (PCF), a first request for charging policy information for a packet data unit (PDU) session of a wireless device;
  - determine the charging policy information for the PDU session of the wireless device, wherein the charging policy information indicates a charging method comprising one or more of:
    - online charging;
    - offline charging; and
    - converged charging;
  - send, to the PCF, a message comprising the charging policy information;
  - receive, by the CHF from a session management function (SMF), a second request to establish a charging session, wherein the second request comprises the charging method; and
  - send, to the SMF, a confirmation for the charging method.

12. The apparatus of claim 11, wherein the first request comprises at least one of:
- an identifier of the wireless device;
- a UE IP address; or
- an identifier of the PDU session.

13. The apparatus of claim 11, wherein the instructions, when executed by the one or more processors, further cause the apparatus to receive, from the PCF, the first request via a network function.

14. The apparatus of claim 11, wherein the determination is based on at least one of:
- an identifier of the wireless device;
- a type of PDU session;
- an access type;
- a radio access technology (RAT) type;
- a public land mobile network (PLMN) identifier;
- an application identifier;
- a data network name (DNN);
- a single network slice selection assistance information (S-NSSAI);
- the identifier of the PDU session; or
- user location information.

15. The apparatus of claim 11, wherein the charging policy information further comprises a charging rate applied to the PDU session.

16. The apparatus of claim 15, wherein the second request comprises the charging rate.

17. The apparatus of claim 11, wherein the charging policy information further comprises an address of the CHF applied to the PDU session.

18. The apparatus of claim 11, wherein the second request further comprises a requested charging method indication, wherein the requested charging method indication comprises at least one of:
- an information element indicating a requested online charging;
- an information element indicating a requested offline charging; or
- an information element indicating a requested converged charging.

19. The apparatus of claim 11, wherein the instructions, when executed by the one or more processors, further cause the apparatus to send, to the SMF, a charging data response message comprising an accepted charging method indication, wherein the accepted charging method indication comprises at least one of:
- an information element indicating an accepted online charging;
- an information element indicating an accepted offline charging; or
- an information element indicating an accepted converged charging.

20. A system comprising:
- a policy control function (PCF);
- a session management function (SMF); and
- an apparatus comprising:
  - one or more processors; and
  - memory storing instructions that, when executed by the one or more processors, cause a charging function (CHF) to:
    - receive, from the PCF, a first request for charging policy information for a packet data unit (PDU) session of a wireless device;
    - determine the charging policy information for the PDU session of the wireless device, wherein the charging policy information indicates a charging method comprising one or more of:

online charging;
offline charging; and
converged charging;

send, to the PCF, a message comprising the charging policy information;

receive, by the CHF from the SMF, a second request to establish a charging session, wherein the second request comprises the charging method; and send, to the SMF, a confirmation for the charging method.

* * * * *